(12) United States Patent
Frey et al.

(10) Patent No.: US 11,493,673 B2
(45) Date of Patent: Nov. 8, 2022

(54) ARTICLE AND METHODS OF MAKING THE SAME

(71) Applicant: 3M INNOVATIVE PROPERTIES COMPANY, St. Paul, MN (US)

(72) Inventors: Matthew H. Frey, Cottage Grove, MN (US); Megan A. Creighton, Somerville (MN); Morgan A. Priolo, Woodbury, MN (US); Benjamin R. Coonce, South St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 364 days.

(21) Appl. No.: 16/622,991

(22) PCT Filed: Jun. 20, 2018

(86) PCT No.: PCT/IB2018/054547
§ 371 (c)(1),
(2) Date: Dec. 16, 2019

(87) PCT Pub. No.: WO2019/003056
PCT Pub. Date: Jan. 3, 2019

(65) Prior Publication Data

US 2021/0149092 A1   May 20, 2021

Related U.S. Application Data

(60) Provisional application No. 62/526,790, filed on Jun. 29, 2017.

(51) Int. Cl.
*G02B 5/02* (2006.01)
*B29C 35/08* (2006.01)
(Continued)

(52) U.S. Cl.
CPC ........ *G02B 5/0226* (2013.01); *B29C 35/0805* (2013.01); *B29D 11/00798* (2013.01);
(Continued)

(58) Field of Classification Search
CPC .. G02B 5/0226; G02B 5/0268; G02B 5/0278; G02B 5/02; G02B 5/0205; G02B 5/021;
(Continued)

(56) References Cited

U.S. PATENT DOCUMENTS

RE28,102 E    8/1974  Mayhew
4,071,808 A   1/1978  Zentmyer
(Continued)

FOREIGN PATENT DOCUMENTS

EP    0556790    12/1998
EP    1273428    1/2003
(Continued)

OTHER PUBLICATIONS

Cote, "Flash Reduction and Patterning of Graphite Oxide and Its Polymer Composite", Journal of the American Chemical Society, Jul. 2009, vol. 131, pp. 11027-11032.
(Continued)

*Primary Examiner* — Derek S. Chapel
*Assistant Examiner* — Adam W Booher

(57) ABSTRACT

Article (9,19) comprising a substrate (10, 20) comprising a polymer and having first (11,21) and second (12, 22) opposed major surfaces. The first major surface (11, 21) has first surface regions (13, 23) with first nanoparticles (14*a*, 14*b*, 14*c*, 14*d*, 24*a*, 24*b*, 24*c*, 24*d*) partially embedded into the first major surface (11, 21), and one of •(a) second surface regions (15) free of nanoparticles; or •(b) second surface regions (25) with at least second nanoparticles (28) on the first major surface (11, 21) or partially embedded into the first major surface (11, 21). The first surface regions (13,
(Continued)

23) have a first average surface roughness, $R_{a1}$, of at least 20 nm, wherein the second surface regions (15, 25) have a second average surface roughness, $R_{a2}$, of less than 100 nm, wherein the first average surface roughness, $R_{a1}$, is greater than the second average surface roughness, $R_{a2}$, and wherein there is an absolute difference between the first and second average surface roughness of at least 10 nm.

20 Claims, 11 Drawing Sheets

(51) Int. Cl.
B29D 11/00 (2006.01)
G02F 1/13357 (2006.01)
(52) U.S. Cl.
CPC ......... *G02B 5/0268* (2013.01); *G02B 5/0278* (2013.01); *B29C 2035/0822* (2013.01); *B29C 2035/0838* (2013.01); *G02F 1/133603* (2013.01); *G02F 1/133606* (2013.01); *G02F 1/133611* (2013.01)
(58) Field of Classification Search
CPC .. G02B 5/0221; G02B 5/0263; G02B 5/0284; G02B 5/0294; G02B 1/12; B29C 35/0805; B29C 2035/0822; B29C 2035/0838; B29D 11/00798; G02F 1/133603; G02F 1/133606; G02F 1/133611
See application file for complete search history.

(56) References Cited

U.S. PATENT DOCUMENTS

| | | | |
|---|---|---|---|
| 4,419,993 A | 12/1983 | Petersen | |
| 4,741,918 A | 5/1988 | Nagy de Nagybaczon | |
| 5,318,650 A | 6/1994 | Kerawalla | |
| 5,411,576 A | 5/1995 | Jones | |
| 5,472,481 A | 12/1995 | Jones | |
| 5,706,804 A | 1/1998 | Baumann | |
| 5,908,598 A | 6/1999 | Rousseau | |
| 5,925,402 A | 7/1999 | Nacker | |
| 6,025,014 A | 2/2000 | Stango | |
| 6,376,806 B2 | 4/2002 | Yoo | |
| 6,511,701 B1 | 1/2003 | Divigalpitiya | |
| 6,801,276 B1 | 10/2004 | Epstein | |
| 7,501,773 B2 | 3/2009 | Tipton | |
| 7,777,832 B2 | 8/2010 | Richard | |
| 8,968,525 B2 * | 3/2015 | Huang | H01B 1/24 204/157.47 |
| 2009/0147179 A1 | 6/2009 | Yamashita | |
| 2010/0110331 A1 | 5/2010 | Han | |
| 2013/0010400 A1 | 1/2013 | McConnell | |
| 2013/0251948 A1* | 9/2013 | Lyons | B29C 59/025 427/180 |
| 2014/0329082 A1 | 11/2014 | Divigalpitiya | |
| 2015/0030783 A1 | 1/2015 | Suganuma | |
| 2015/0344712 A1 | 12/2015 | Harrison | |
| 2016/0064693 A1 | 3/2016 | Moon | |
| 2016/0122584 A1 | 5/2016 | Buskens | |
| 2016/0190357 A1* | 6/2016 | Kawashima | G02B 1/111 438/71 |
| 2016/0351424 A1 | 12/2016 | Fuse | |

FOREIGN PATENT DOCUMENTS

| | | |
|---|---|---|
| JP | 2002321279 | 11/2002 |
| WO | WO 1994-21452 | 9/1994 |
| WO | WO 2001-85361 | 11/2001 |
| WO | WO 2007-140469 | 6/2007 |
| WO | WO 2014-088950 | 6/2014 |
| WO | WO 2016-154195 | 9/2016 |
| WO | WO 2019-003115 | 1/2019 |
| WO | WO 2019-003153 | 1/2019 |
| WO | WO 2019-025943 | 2/2019 |

OTHER PUBLICATIONS

Jiu, "Strongly adhesive and flexible transparent silver nanowire conductive films fabricated with a high-intensity pulsed light technique", Journal of Materials Chemistry, 2012, vol. 22, pp. 23561-23567.
Kim, "Selective Light-Induced Patterning of Carbon Nanotube/ Silver Nanoparticle Composite to Produce Extremely Flexible Conductive Electrodes", Applied Materials & Interfaces, Feb. 2017, vol. 9, pp. 6163-6170.
Luu, "Preparation and Optical Properties of Silver Nanowires and Silver Nanowire Thin Films," Journal of Colloid and Interface Science, 2011, vol. 356, pp. 151-158.
Secor, "Rapid and Versatile Photonic Annealing of Graphene Inks for Flexible Printed Electronics", Advanced Materials, 2015, vol. 27, pp. 6683-6688.
International Search Report for PCT International Application No. PCT/IB2018/054547, dated Sep. 25, 2018, 6 pages.

* cited by examiner

ARTICLE AND METHODS OF MAKING THE SAME

CROSS REFERENCE TO RELATED APPLICATIONS

This application is a national stage filing under 35 U.S.C. 371 of PCT/IB2018/054547, filed Jun. 20, 2018, which claims the benefit of U.S. Provisional Patent Application No. 62/526,790, filed Jun. 29, 2017, the disclosures of which are incorporated by reference herein in its/their entirety.

BACKGROUND

Light diffusing articles are used, for example, in backlit displays, luminaires, button panels, illuminated signs, and instrument panels. The articles derive light diffusing properties from surface topography (e.g., roughness), an arrangement of multiple phases (e.g., particles dispersed in a matrix (e.g., in the form of a coating), or both. Such light diffusing articles may be made of transparent materials and be transparent. That is, useful articles are known that allow the passage of light through their volume, whilst altering the direction of light passage or light exit, (e.g., by refraction or by scattering). Light diffusing surface topography has been generated as part of transparent articles by, for example, molding a transparent polymer against a structured tool. Molding light diffusing surface topography has certain limitations. Specifically, for molding, each new design of light diffusing article requires the generation of new structured tooling. Also, structured tooling that can impart a gradient in light diffusing properties to a molded article presents challenges in fabrication. Thus, there is a need in the art for fabrication methods for articles (e.g., transparent articles) having surface topography (e.g., roughness) that avoid the expense and challenge of fabricating custom mold tooling, that allow for the generation of arbitrary patterns of light diffusing properties, and that provide a convenient path to gradients in light diffusing properties.

It is known in the art that intense pulsed light can be applied to article substrates bearing nanoparticles on their surface. Such exposure to light has been reported to reduce the sheet resistance and increase the adhesion of metal nanowires on polymer substrate surfaces, whilst avoiding undesirable substrate damage or destruction (see, e.g., "Strongly Adhesive And Flexible Transparent Silver Nanowire Conductive Films Fabricated With A High-Intensity Pulsed Light Technique," Jinting Jiu, Masaya Nogi, Tohru Sugahara, Takehiro Tokuno, Teppei Araki, Natsuki Komoda, Katsuaki Suganuma, Hiroshi Uchidab and Kenji Shinozaki, Journal of Materials Chemistry, Vol. 22, pp. 23561-23567, 2012).

SUMMARY

In one aspect, the present disclosure describes an article having a substrate comprising a polymer and having first and second opposed major surfaces, wherein the first major surface has first surface regions with first nanoparticles partially embedded into the first major surface, and one of
(a) second surface regions free of nanoparticles; or
(b) second surface regions with at least second nanoparticles on the first major surface or partially embedded into the first major surface,
wherein each region has an area of at least 10 square micrometers, wherein the first surface regions have a first average surface roughness, $R_{a1}$, of at least 20 (in some embodiments, at least 25, 50, 75, 100, 150, 200, 250, 300, 400, 500, 600, 700, 800, 900, or even at least 1000; in some embodiments, in a range from 20 to 1000, 25 to 1000, 25 to 500, 30 to 250, or even 40 to 100) nm, wherein the second surface regions have a second average surface roughness, $R_{a2}$, of less than 100 (in some embodiments, less than 95, 90, 80, 75, 70, 60, 50, 45, 40, 35, 30, 25, 20, 15, 10, or even less than 5; in some embodiments, in a range from 1 to 20, 2 to 15, or even 3 to 10) nm, wherein the first average surface roughness $R_{a1}$ is greater than the second average surface roughness $R_{a2}$, and wherein there is an absolute difference between the first and second average surface roughness of at least 10 (in some embodiments, at least 15, 20, 25, 50, 75, 100, 150, 200, 250, 300, 400, 500, 600, 700, or even at least 750; in some embodiments, in a range from 10 to 750, 20 to 700, or even 25 to 500) nm. In some embodiments, the second surface regions of the article are free of nanoparticles (i.e., no nanoparticles). In some embodiments, the second surface regions have at least second nanoparticles on the first major surface or partially embedded into the first major surface. In some embodiments, the first nanoparticles are the same as the second nanoparticles (i.e., the same composition, microstructure, size, and shape). In some embodiments, the nanoparticles are light-absorbing nanoparticles (e.g., metallic nanoparticles, carbon nanoparticles, or light-absorbing ceramic nanoparticles). In some embodiments, the polymer and the article are transparent. In some embodiments, the first surface region of the article is translucent.

In another aspect, the present disclosure describes a method of making an article described herein, the method comprising:
providing a precursor article comprising:
a substrate comprising a polymer and having first and second opposed major surfaces; and
light absorbing (i.e., absorbs at least one wavelength of light in a range from 180 nm to 10,000 nm) nanoparticles arranged on at least a portion of the first major surface of the substrate;
illuminating the portion including at least some of the light absorbing nanoparticles of the first major surface to roughen the polymer in the portion of the first major surface to provide the article. In some embodiments, the polymer and the article are transparent. In some embodiments, the article is translucent. In some embodiments, the light absorbing nanoparticles are arranged on at least a portion of the first major surface of the substrate.

In some embodiments, articles described herein are light diffusers.

DETAILED DESCRIPTION

In general, methods described herein can provide articles with controlled surface structure in the form of roughness induced by illumination with, for example, intense pulsed light. A precursor article with nanoparticles on a major surface is illuminated per illumination parameters to initiate a process, wherein a polymer of the precursor article develops roughness. For "nanoparticles on a major surface" there may be some binder or adhesive present holding the nanoparticles to the major surface, and which may be interposed between nanoparticles the major surface.

The degree of roughness can be controlled, for example, based on the type of nanoparticles, the illumination parameters, and the selection (e.g., composition) of polymer. For such articles and polymers, when transparent or translucent, the methods described herein yield materials with diffusing properties for transmitted light. Light diffusing materials are useful, for example, in backlit displays, luminaires, button panels, illuminated signs, and instrument panels.

Figure 1:
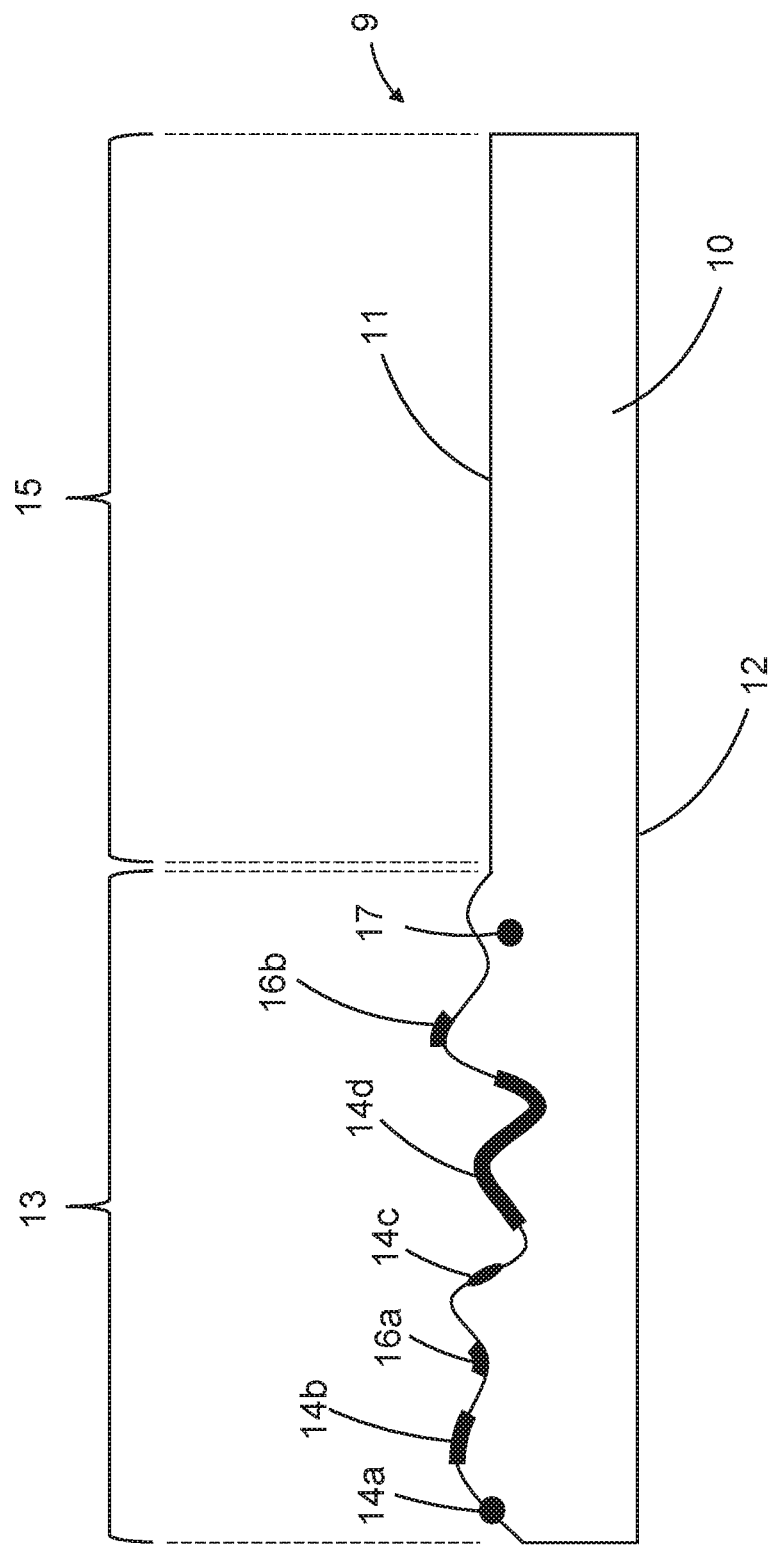
FIG. 1 is a schematic of an exemplary article described herein.

Referring to FIG. 1, exemplary article 9 comprises substrate 10. Substrate 10 comprises a polymer and has first and second opposed major surfaces 11, 12. First major surface 11 has first surface regions 13 with first nanoparticles 14a, 14b, 14c, and 14d partially embedded into first major surface 11. Partially embedded nanoparticles 14b and 14d follow the contour of first major surface 11 in first surface regions 13. Second surface regions 15 are free of nanoparticles. First surface regions 13 optionally include non-embedded particles 16a and 16b on first major surface 11. First surface regions 13 optionally include fully embedded particles 17 beneath first major surface 11. First major surface 11 of polymer substrate 10 in first surface regions 13 has a first average surface roughness, $R_{a1}$, of at least 20 (in some embodiments, at least 25, 50, 75, 100, 150, 200, 250, 300, 400, 500, 600, 700, 800, 900, or even at least 1000; in some embodiments, in a range from 20 to 1000, 25 to 1000, 25 to 500, 30 to 250, or even 40 to 100) nm. First major surface 11 of polymer substrate 10 in second surface regions 15 has a second average surface roughness, $R_{a2}$, of less than 100 (in some embodiments, less than 95, 90, 80, 75, 70, 60, 50, 45, 40, 35, 30, 25, 20, 15, 10, or even less than 5; in some embodiments, in a range from 1 to 20, 2 to 15, or even 3 to 10) nm. The first average surface roughness $R_{a1}$ is greater than the second average surface roughness $R_{a2}$. Regions 13, 15 each have an area of at least 10 square micrometers. There is an absolute difference between first and second average surface roughnesses $R_{a1}$ and $R_{a2}$ of at least 10 (in some embodiments, at least 15, 20, 25, 50, 75, 100, 150, 200, 250, 300, 400, 500, 600, 700, or even at least 750; in some embodiments, in a range from 10 to 750, 20 to 700, or even 25 to 500) nm.

Figure 2:
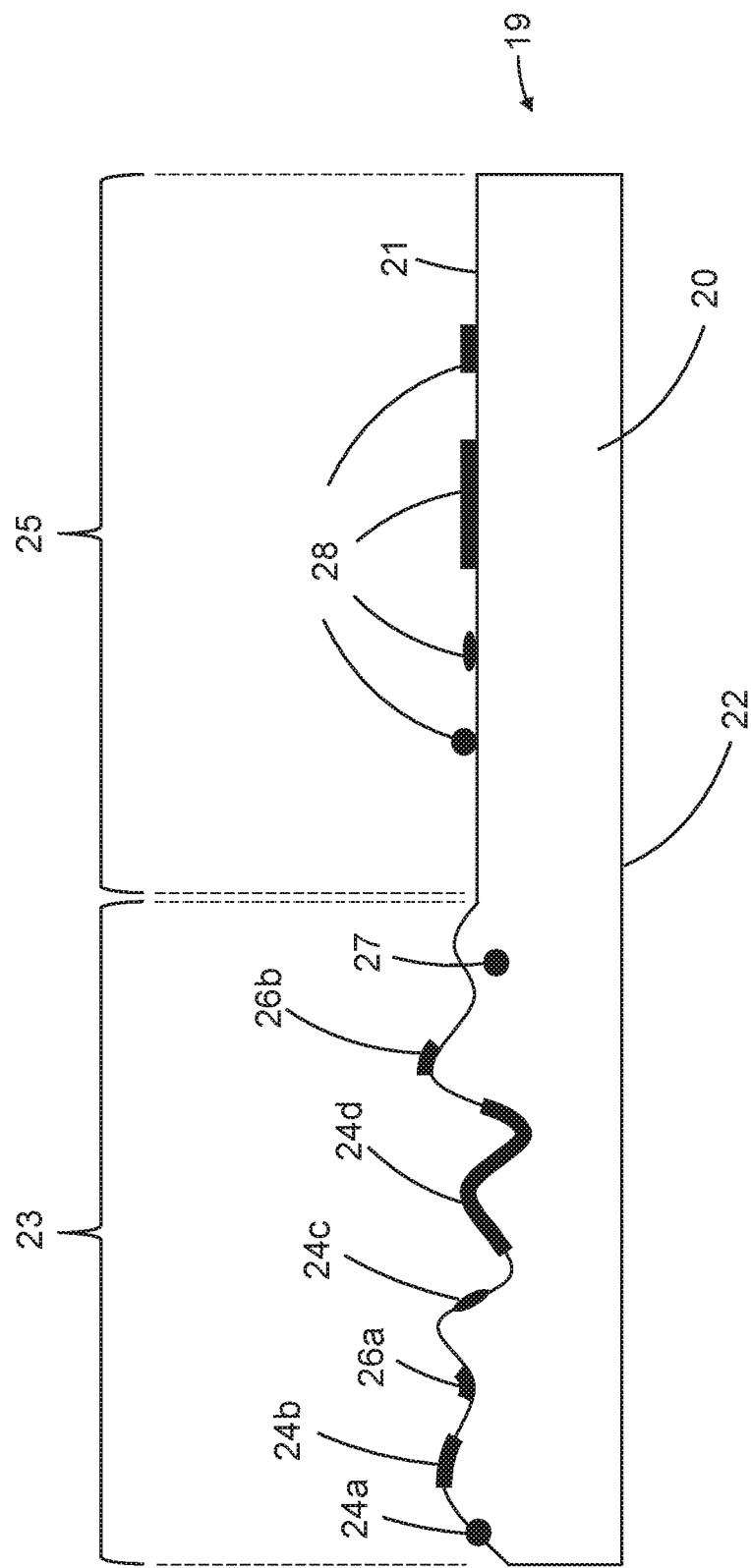
FIG. 2 is a schematic of another exemplary article described herein.

Referring to FIG. 2, exemplary article 19 comprises substrate 20. Substrate 20 comprises a polymer and has first and second opposed major surfaces 21, 22. First major surface 21 has first surface regions 23 with first nanoparticles 24a, 24b, 24c, and 24d partially embedded into first major surface 21. First surface regions 23 optionally include non-embedded particles 26a and 26b on the first major surface 21. First surface regions 23 optionally include fully embedded particles 27 beneath first major surface 21. Second surface regions 25 have at least second nanoparticles 28 on first major surface 21. First major surface 21 of polymer substrate 20 in first surface regions 23 has a first average surface roughness, $R_{a1}$, of at least 20 (in some embodiments, at least 25, 50, 75, 100, 150, 200, 250, 300, 400, 500, 600, 700, 800, 900, or even at least 1000; in some embodiments, in a range from 20 to 1000, 25 to 1000, 25 to 500, 30 to 250, or even 40 to 100) nm. First major surface 21 of polymer substrate 20 in second surface regions 25 have a second average surface roughness, $R_{a2}$, of less than 100 (in some embodiments, less than 95, 90, 80, 75, 70, 60, 50, 45, 40, 35, 30, 25, 20, 15, 10, or even less than 5; in some embodiments, in a range from 1 to 20, 2 to 15, or even 3 to 10) nm. The first average surface roughness $R_{a1}$ is greater than the second average surface roughness $R_{a2}$. Regions 23, 25 each have an area of at least 10 square micrometers. There is an absolute difference between first and second average surface roughnesses $R_{a1}$ and $R_{a2}$ of at least 10 (in some embodiments, at least 15, 20, 25, 50, 75, 100, 150, 200, 250, 300, 400, 500, 600, 700, or even at least 750; in some embodiments, in a range from 10 to 750, 20 to 700, or even 25 to 500) nm. Optionally, second surface regions 25 also has at least some partially embedded second nanoparticles on first major surface 21.

Figure 3:
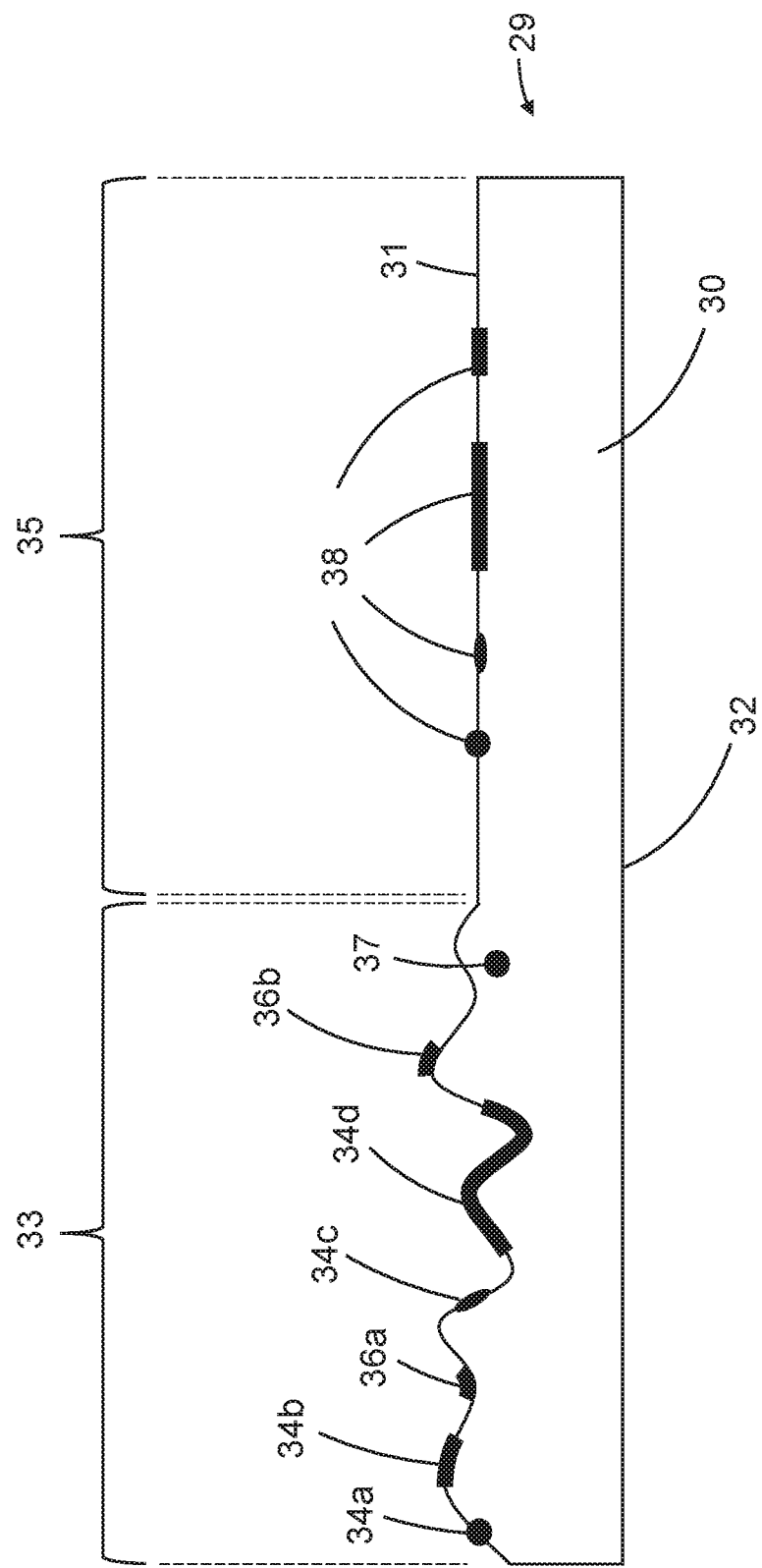
FIG. 3 is a schematic of another exemplary article described herein.

Referring to FIG. 3, exemplary article 29 comprises substrate 30. Substrate 30 comprises a polymer and has first and second opposed major surfaces 31, 32. First major surface 31 has first surface regions 33 with first nanoparticles 34a, 34b, 34c, and 34d partially embedded into first major surface 31. First surface regions 33 optionally include non-embedded particles 36a and 36b on first major surface 31. First surface regions 33 optionally include fully embedded particles 37 beneath first major surface 31. Second surface regions 35 has at least second nanoparticles 38 partially embedded into first major surface 31. First major surface 31 of polymer substrate 30 in first surface regions 33 has a first average surface roughness, $R_{a1}$, of at least 20 (in some embodiments, at least 25, 50, 75, 100, 150, 200, 250, 300, 400, 500, 600, 700, 800, 900, or even at least 1000; in some embodiments, in a range from 20 to 1000, 25 to 1000, 25 to 500, 30 to 250, or even 40 to 100) nm. First major surface 31 of polymer substrate 30 in second surface regions 35 has a second average surface roughness, $R_{a2}$, of less than 100 (in some embodiments, less than 95, 90, 80, 75, 70, 60, 50, 45, 40, 35, 30, 25, 20, 15, 10, or even less than 5; in some embodiments, in a range from 1 to 20, 2 to 15, or even 3 to 10) nm. The first average surface roughness $R_{a1}$ is greater than the second average surface roughness $R_{a2}$. Regions 33, 34 each have an area of at least 10 square micrometers. There is an absolute difference between first and second average surface roughnesses $R_{a1}$ and $R_{a2}$ of at least 10 (in some embodiments, at least 15, 20, 25, 50, 75, 100, 150, 200, 250, 300, 400, 500, 600, 700, or even at least 750; in some embodiments, in a range from 10 to 750, 20 to 700, or even 25 to 500) nm. Optionally, second surface regions 35 also has at least some non-embedded second nanoparticles on first major surface 31.

In some embodiments, the second surface regions of the article are free of nanoparticles (i.e., no nanoparticles).

In some embodiments, the second surface regions have at least second nanoparticles on the first major surface or partially embedded into the first major surface.

In some embodiments, the first nanoparticles are the same as the second nanoparticles (i.e., the same composition, microstructure, size, and shape).

In some embodiments, the nanoparticles are collectively in a pattern. In some embodiments, the first nanoparticles are collectively in a pattern. In some embodiments, the second nanoparticles are collectively in a pattern.

The nanoparticles in a surface region are described herein to have a composition. It is within the scope of the disclosure for nanoparticles described herein to have a composition to be comprised of nanoparticles having multiple compositions. The nanoparticles in a surface region are described herein to have a size and a shape. It is within the scope of the disclosure for particles described herein to have a size and a shape to have at least one of a distribution of sizes and a variety of shapes.

The surface roughness, $R_a$, is measured by determining the surface topography (i.e., height versus position) using an atomic force microscope, and then calculating the arithmetic average of the absolute values of the surface height deviations measured from the mean plane of the measurement area. For surface regions of articles described herein that are free of nanoparticles (i.e., no nanoparticles), the surface topography is defined by the exposed surface of the substrate (e.g., polymer surface). Accordingly, the surface roughness, $R_a$, of such a surface region comprising a polymer is the surface roughness, $R_a$, of the polymer surface (also referred to herein as the surface roughness, $R_a$, of the polymer). For surface regions of the article that include nanoparticles, the surface topography is defined by the exposed surface of the substrate (e.g., polymer surface) and exposed surfaces, if present, of the nanoparticles. If nanoparticles are fully embedded into the surface of the substrate (e.g., polymer surface), the surface topography of the surface region is defined by the exposed surface of the substrate (e.g., polymer surface), and the surface roughness, $R_a$, of such a surface region comprising a polymer is the surface roughness, $R_a$, of the polymer surface. If the nanoparticles are not embedded or are partially embedded into the surface, the surface topography of the surface region is defined by the exposed surface of the substrate (e.g., polymer surface) and the exposed surfaces of the nanoparticles. If the sizes of the nanoparticles are small as compared with the measured surface roughness, $R_a$, (e.g., nanoparticle dimension is less than 50 percent of the measured surface roughness, $R_a$ (in some embodiments, less than 25 percent, 10 percent, or even less than 5 percent)), then the measured surface roughness, $R_a$, of such a surface region is approximately the surface roughness $R_a$ of the polymer. Herein, the measured surface roughness, $R_a$, of such a surface region is taken as the measured surface roughness, $R_a$, of the polymer surface (also referred to herein as the surface roughness, $R_a$, of the polymer).

Exemplary polymers for the substrate include thermoplastic polymers. In some embodiments, the polymer is at least one of poly(ethyleneterephthalate), poly(ethylenenaphthalate), a polycarbonate, a cylo-olefin polymer, a cylo-olefin co-polymer, an acrylate, or a methacrylate. Suitable polymers are commercially available, for example, from DuPont, Chester, VA, under the trade designations "TEIJEN FILMS ST504" or "TEIJEN FILMS Q65FA." In some embodiments, the polymer, for example, a thermoplastic polymer, has glass transition temperature, also referred to herein as $T_g$, less than 150° C. (in some embodiments less than 140° C., 130° C., 120° C., 110° C., 100° C., 90° C., or even less than 80° C.; in some embodiments, in a range from 50° C. to 150° C., 60° C. to 140° C., 70° C. to 130° C., or even 85° C. to 125° C.).

In some embodiments, the article comprises transparent material (e.g., polymer) and has a thickness and a visible light transmittance through the thickness of at least 25% (in some embodiments, at least 30%, 35%, 40%, 45%, 50%, 55%, 60%, 65%, 70%, 75%, 80%, 85%, or even at least 90%). In some embodiments, the article is translucent in at least one surface regions (e.g., first surface region). "Transparent" means transmits at least 25 percent of 90° incident light to the surface of the material; and "translucent" means transmits with diffusion at least 25 percent of 90° incident light to the surface of the material, wherein diffusion means transmission with haze (determined as described in the Examples, below) greater than 5 percent or clarity (determined as described in the Examples, below) less than 95 percent.

In some embodiments, the nanoparticles are light-absorbing nanoparticles, for example metallic nanoparticles, carbon nanoparticles, or light-absorbing ceramic nanoparticles. In some embodiments, the nanoparticles are organic nanoparticles, for example organic pigment particles. By light absorbing, what is meant is that the nanoparticle has a primary mechanism of absorption of light (e.g., electronic transition or plasmon resonance), as is known in the art, for at least one wavelength of light in a range from 180 nanometers to 10 micrometers (in some embodiments, in a range from 200 nanometers to 3 micrometers, or even 250 nanometers to 1 micrometer). The inclusion of nanoparticles having such light absorption characteristics and preferable light absorption characteristics advantageously enables the practical fabrication of the articles disclosed herein by the methods disclosed herein.

In some embodiments, the nanoparticles, which for making the articles described herein, are metallic (e.g., nanoparticles comprising at least one of silver, gold, palladium, platinum, copper, or aluminum). Suitable nanoparticles are commercially available, for example, from Cambrios, Inc., Sunnyvale, Calif., under the trade designation "INK A;" or from Sigma-Aldrich, Incorporated, St. Louis, Mo., under the trade designation "753653." In some embodiments, at least a portion of the nanoparticles are nanowires. In some embodiments, the nanoparticles are carbon nanoparticles (e.g., carbon black, exfoliated graphite, carbon nanotubes, single-layer graphene, many-layer graphene (e.g., 2-layer graphene, 3-layer graphene, 4-layer graphene)). Carbon nanoparticles are not limited with respect to allotrope.

In some embodiments, the nanoparticles are light-absorbing ceramic nanoparticles (e.g., ruthenium oxide, tungsten oxide, molybdenum oxide, vanadium oxide, niobium oxide, indium oxide, tin oxide, silver oxide, titanium dioxide, zinc oxide, iron oxide, nickel oxide, copper oxide, manganese oxide, chromium oxide, lanthanide series oxides, mixtures thereof, and mixtures of at least one of these with other metal oxides or metalloid oxides).

In some embodiments, the sizes of the nanoparticles are in a range from 1 nm to 1 micrometer (in some embodiments, in a range from 10 nm to 100 nm, or even 10 nm to 50 nm). As used herein, the term "size of a nanoparticle" refers to any dimension of the nanoparticle (e.g., diameter of a nanowire, diameter of a spherical nanoparticle, or thickness of a nanoplatelet). For a nanoparticle to have a size within a stated range, it is not required that all dimensions of the nanoparticle fall within that range. For a nanoparticle to have a size within a stated range, it is required that at least one dimension of the nanoparticle falls within that range. For a nanoparticle to have a size within a stated range, it is possible for at least two dimensions of the nanoparticle to fall within that range (e.g., both the radius and the length of a prolate ellipsoidal nanoparticle may fall within the stated range).

In another aspect, the present disclosure describes a method of making an article described herein, the method comprising:
providing a precursor article comprising:
a substrate comprising first and second opposed major surfaces, wherein the first surface comprises a polymer; and
light absorbing nanoparticles arranged on at least a portion of the first major surface of the substrate;
illuminating the portion including at least some of the light absorbing nanoparticles of the first major surface to roughen the portion of the polymer of first major surface to provide the article. In some embodiments, the polymer and the article are transparent. In some embodiments, the article is translucent. In some embodiments, the light absorbing nanoparticles are arranged on at least a portion of the first major surface of the substrate.

In some embodiments, the substrate has a thickness and a first haze through the thickness of the substrate before illuminating the light absorbing nanoparticles, and wherein the article has a thickness (that includes the thickness of the substrate) and a second haze after illuminating the light absorbing nanoparticles for at least some portions (e.g., surface regions) of the article. As used herein, the term haze (also referred to herein as transmitted haze) is the proportion of transmitted light that is deflected by at least 2.5° as it passes through an article, as defined by ASTM International Standard Designation D1003-11, the disclosure of which is incorporated herein by reference. Haze is determined as described in the Examples, below. Haze is expressed as a percentage, wherein an article with zero percent haze scatters none of its transmitted light by more than 2.5°. In general, the second haze is greater than the first haze. In some embodiments, the second haze is at least 1.25 (in some embodiments, at least 1.5, 2, 3, 4, 5, 10, 15, 20, 25, 30, 35, 40, 45, 50, 60, 70, 75, 80, or even at least 90; in some embodiments, in a range from 1.25 to 90, 1.5 to 80, 2 to 70, 3 to 60, or even 5 to 50) times the first haze. In some embodiments, the second haze is greater than the first haze and the difference between the second haze and the first haze is at least 2 (in some embodiments, at least 3, 4, 5, 10, 15, 20, 25, 30, 35, 40, 45, 50, 60, 70, 75, 80, or even at least 90; in some embodiments, in a range from 2 to 90, 5 to 80, 10 to 75, 15 to 70, 20 to 65, 25 to 60, or even 30 to 50) percent.

In some embodiments, the substrate has a thickness and a first clarity through the thickness of the substrate before illuminating the light absorbing nanoparticles, wherein the article has a thickness (that includes the thickness of the substrate) and a second clarity after illuminating the light absorbing nanoparticles for at least some portions (e.g., surface regions) of the article. As used herein, the term clarity relates to the proportion of transmitted light that is not deflected as it passes through an article versus the sum of the light that is not deflected or deflected by an angle of less than 2.5°. Clarity is a known optical property in the art and can be measured using a standard commercially available instrument such as that marketed under the trade designation "HAZE-GARD I" by BYK-Gardner, Columbia, Md. Clarity is determined as described in the Examples, below. Clarity is expressed as a percentage, wherein an article with 100 percent clarity is characterized by 100 percent of the light transmitted within a cone of 2.5° not being measurably deflected (i.e., 0° deflection). Articles with clarity values less than 100 percent have a portion of their light transmitted within a cone of 2.5° that is measurably deflected by an angle greater than zero degrees. In general, the second clarity is less than or equal to the first clarity. In some embodiments, the second clarity is less than 0.98 (in some embodiments, less than 0.95, 0.9, 0.8. 0.75, 0.7, 0.65, 0.6, 0.55, 0.5, 0.4, 0.35, 0.3, 0.25, 0.2, or even less than 0.15; in some embodiments, in a range from 0.1 to less than 0.98, 0.2 to 0.95, 0.3 to 0.9, 0.4 to 0.8, or even 0.5 to 0.7) times the first clarity. In some embodiments, the second clarity is less than the first clarity and the difference between the first clarity and the second clarity is at least 2 percent (in some embodiments, at least 3, 4, 5, 10, 15, 20, 25, 30, 35, 40, 45, or even at least 50; in some embodiments, in a range from 2 to 90, 5 to 80, 10 to 70, 20 to 50, or even 30 to 50) percent.

In some embodiments, the second haze is greater than the first haze and the second clarity is less than the first clarity. In some such embodiments, the second haze is in a range from 2 to 70 times the first haze and the second clarity is in a range from 0.1 to 0.98 times the first clarity.

In some embodiments, the second haze is in a range from 5 to 50 times the first haze and the second clarity is in a range from 0.2 to 0.95 times the first clarity.

In some embodiments, the second haze is in a range from 5 to 20 times the first haze and the second clarity is in a range from 0.2 to 0.6 times the first clarity.

In some embodiments, the second haze is in a range from 2 to 4 times the first haze and the second clarity is in a range from 0.5 to 0.9 times the first clarity. In some such embodiments, the difference between the second haze and the first haze is in a range from 2 percent to 90 percent and the difference between the first clarity and the second clarity is in a range from 2 percent to 90 percent.

In some embodiments, the difference between the second haze and the first haze is in a range from 5 percent to 80 percent and the difference between the first clarity and the second clarity is in a range from 5 percent to 80 percent.

In some embodiments, the difference between the second haze and the first haze is in a range from 5 percent to 30 percent and the difference between the first clarity and the second clarity is in a range from 40 percent to 80 percent.

In some embodiments, the difference between the second haze and the first haze is in a range from 10 percent to 25 percent and the difference between the first clarity and the second clarity is in a range from 50 percent to 70 percent.

In some embodiments, the difference between the second haze and the first haze is in a range from 2 percent to 10 percent and the difference between the first clarity and the second clarity is in a range from 5 percent to 50 percent.

In some embodiments, the difference between the second haze and the first haze is in a range from 2 percent to 5 percent and the difference between the first clarity and the second clarity is in a range from 10 percent to 40 percent.

In some embodiments, the substrate has a major surface with nanoparticles on the major surface and a first average surface roughness, $R_{a\text{-}before}$, before illuminating the light absorbing nanoparticles. And, the major surface has a second average surface roughness, $R_{a\text{-}after}$, after illuminating the light absorbing nanoparticles for at least some portions (e.g., surface regions) of the article. $R_{a\text{-}after}$ is greater than $R_{a\text{-}before}$. The absolute difference between $R_{a\text{-}before}$ and $R_{a\text{-}after}$ may be at least 10 (in some embodiments, at least 15, 20, 25, 50, 75, 100, 150, 200, 250, 300, 400, 500, 600, 700, or even at least 750; in some embodiments, in a range from 10 to 750, 20 to 700, or even 25 to 500) nm.

In some methods for making articles described herein, the light absorbing nanoparticles are arranged in a pattern before illuminating at least some of the absorbing nanoparticles. For example, light absorbing particles may be arranged in a pattern on the article surface so that selective surface roughening, and hence light diffusion properties that are subsequently defined, at least in part by their pattern, can be positioned with respect to other components of a system within which the article will be integrated. For example, the light-diffusing regions of the article can be positioned with respect to discrete sources of light in such a system. In one exemplary embodiment, the finished article with patterned surface roughness (and hence patterned light diffusion properties) may be combined with light emitting diodes (LEDs) as point sources of light, in, for example, the backlight unit of a liquid crystal display (LCD). In such a backlight unit, light emitted from point sources must be guided and redirected to generate a uniform areal source of light behind the LCD cell (e.g., a Lambertian emitter). To transform the highly non-uniform light intensity distribution generated by discrete LEDs (e.g., arranged in a two-dimensional pattern behind the LCD cell or arranged along the periphery of the backlight unit behind the LCD cell) into a uniform areal light source, it can be advantageous to engineer the light scattering (diffusing) properties of intervening materials to vary according to their proximity to the point light sources. For example, the arrangement of light absorbing particles on a polymer film substrate can be selected to yield higher light diffusion properties (e.g., higher transmitted haze or lower clarity) at locations on the film that will be aligned with LED point sources of light in a backlight unit that includes the LEDs and the film.

In another exemplary embodiment, the pattern of nanoparticles (and hence ultimately the pattern of light diffusing surface roughness created when the pattern is processed by illuminating with intense light) can be selected to assist with pattern-wise extraction of light that is being guided within the article. In some such applications, for example, luminaires for lighting living or working spaces or backlights for illumination of displays, graphics, or button panels, light which is generated at a first location and which is directed to waveguide within an article (e.g., a film) is required to be extracted and emitted from the surface of the article at specific locations. Surface structures such as those described herein (with elevated values of transmitted haze, reduced values of clarity, or both), can serve as light extraction structures on an article (e.g., a film). Exposing a pattern of nanoparticles to intense light, and thereby patterning the light extracting features to the pattern of nanoparticles, provides a way to manufacture patterned light extractors.

Patterns of light absorbing nanoparticles arranged on at least a portion a major surface of a substrate (e.g., a polymer substrate surface) may be fabricated by any suitable method. Examples of suitable methods include additive patterning methods such as inkjet printing, flexographic printing, screen printing, and transfer printing (e.g., thermal transfer printing). An example of a suitable subtractive patterning method includes particle coating onto the surface, pattern masking (e.g., by photolithography or mask printing) and then chemical etching. Another example of a suitable subtractive patterning method includes patterning a lift-off mask on the surface, particle coating onto the surface and the lift-off mask, and then lift-off removal of the mask.

Coating of light absorbing nanoparticles onto a major surface of a substrate, for example, a polymer substrate, for the preparation of precursor articles for making articles described herein, may be carried out by any suitable coating process. Examples of suitable coating processes include die-coating, spin-coating, dip-coating, drop-coating, physical vapor deposition, powder rub coating, and chemical vapor deposition, as are known in the art.

In some embodiments, a major surface having nanoparticles partially embedded therein has a tie layer on at least a portion of such major surface. The tie layer may provide improved (e.g., secure) bonding between the nanoparticles and the major surface of the substrate. Tie layers are particularly useful for depositing nanoparticles on the surface of a substrate by powder rub coating. The tie layer may comprise any suitable material such as, for example, at least one of an organic polymer(s) or an inorganic material(s).

Exemplary materials for inclusion in the tie layer include silica (including organosilica) particles and coatings, and polymers such as polyurethane(s), acrylic polymer(s), polyamide(s), polyester(s), polycarbonate(s), rubber(s), polyolefin(s) (e.g., polystyrenes and styrene block co-polymers with butadiene), blends and copolymers thereof.

The tie layer may be coated, for example, out of solvent (e.g., at least one of an organic solvent(s) or water) followed by drying. Alternatively, for example, the tie layer may be coated without inert solvent present. Exemplary organic solvents include at least one of an alcohol(s), an ether(s), or a ketone(s).

In some embodiments, the tie layer comprises at least one curable material. Exemplary curable materials include polymerize and/or crosslink when exposed to at least one of heat, e-beam, ultraviolet light, visible light or upon the addition of at least one of a chemical catalyst, photoinitiator, or moisture. During manufacturing, the curable material is exposed to the appropriate conditions to initiate at least partial curing of the curable material. Exemplary curable materials may include a combination of curable compounds (e.g., at least one of a free-radically polymerizable monomer(s) and/or an epoxy monomer(s)). In some embodiments, the tie layer is non-tacky at ambient temperature.

In some embodiments, the curable material comprises partially cured (meth)acrylic monomer(s) and/or oligomer(s). While not wanting to be bound by theory, it is believed that by controlling the degree of polymerization, it is possible to affect the amount of powder deposited on the tie layer under the same powder rub coating conditions. Advantageously, it is hence possible to prepare a wide variety of tie layers from a relatively simple precursor composition, simply by adjusting cure conditions.

In some embodiments, the curable material is further cured (e.g., fully cured) after the powder-rubbing step.

Examples of curable materials include epoxy resins, amino resins (e.g., aminoplast resins and such as alkylated urea-formaldehyde resins), melamine-formaldehyde resins, alkylated benzoguanamine-formaldehyde resin, acrylate resins (including acrylates and methacrylates), acrylated epoxies, acrylated urethanes, acrylated polyesters, acrylated polyethers, vinyl ethers, acrylated oils, and acrylated silicones, alkyd resins such as urethane alkyd resins, polyester resins, reactive urethane resins, phenolic resins such as resole and novolac resins, phenolic/latex resins, epoxy resins such as bisphenol epoxy resins, isocyanates, isocyanurates, polysiloxane resins (including alkylalkoxysilane resins), and reactive vinyl resins. The resins may be in the form of monomers, oligomers, polymers, or combinations thereof.

Coating and patterning of light absorbing nanoparticles on a major surface of a substrate can be achieved, for example, by first disposing a tie layer material on a portion of the major surface in a pre-determined pattern, yielding tie layer-disposed regions and non-tie layer-disposed regions (i.e., a tie layer pattern). The tie layer pattern may be disposed on the major surface, for example, by printing. Exemplary print methods include flexography, intaglio, lithography, inkjet, valve jet, and spray jet printing. Disposing a tie layer pattern on a major surface of a substrate may result in a major surface of the substrate that includes a tie layer material in first surface regions and that is free of the tie layer material in second surface regions. After the tie layer pattern is disposed on the major surface of the substrate, a light absorbing nanoparticle powder may be powder rub coated onto at least a portion of the tie layer pattern (i.e., the first surface regions, being tie layer-disposed regions). Optionally, any light absorbing nanoparticle powder that is powder rub coated onto the non-tie layer-disposed regions (i.e., second surface regions) may be removed, for example, by physically rubbing with a clean pad, ultrasonic cleaning, or rinsing. Powder rub coating the light absorbing nanoparticle powder onto the tie layer pattern (i.e., the tie layer-disposed regions), and optionally removing the light absorbing nanoparticle powder (i.e., the nanoparticles) from the non-tie layer-disposed regions, yields a pattern of light absorbing nanoparticles arranged on at least a portion of the major surface of the substrate. The aforementioned steps may be used to yield light absorbing nanoparticles that are arranged in a pattern according to a tie layer pattern disposed on the first major surface of a substrate. Such a precursor article may be further processed by illumination, for example, with intense pulsed light, to yield articles having a pattern of surface roughness and light diffusing properties in the first surface regions according to the original tie layer pattern.

In some embodiments, illuminating at least some of the absorbing nanoparticles is conducted at at least one wavelength in a range from 180 nm to 3000 nm. In some embodiments, illuminating the light absorbing nanoparticles is conducted at least in part using a xenon flashlamp. In some embodiments, the wavelengths of light used to illuminate the nanoparticles are selected to include wavelengths that are strongly absorbed by the nanoparticles. For example, 60 nanometer diameter gold nanoparticles, available under the trade designation "753653" from Sigma-Aldrich, St. Louis, Mo., strongly absorb wavelengths in a range from 532 nanometers to 544 nanometers. Another example is 50 nanometer diameter silver nanowires (reported, for example, in "Preparation and Optical Properties of Silver Nanowires and Silver Nanowire Thin Films," Quocanh N. Luu et al., Journal of Colloid and Interface Science, Volume 356, Pages 151-158 (2011)), strongly absorb wavelengths in a range from 350 nanometers to 400 nanometers. Once the absorbing properties (e.g., wavelengths of strong absorption) of the nanoparticle are known, the wavelengths of light used to illuminate the nanoparticles, to roughen the substrate surface, can be selected to match those wavelengths of strong absorption as desired.

In some embodiments, a mask is positioned between the precursor article and an illumination source for illuminating at least some of the absorbing nanoparticles, prior to illuminating at least some of the absorbing nanoparticles. Useful photomasks include those known in the photolithography art, such as binary shadow, greyscale, or interference types. In general, photomasks modulate the areal intensity distribution of light that is directed to pass through them. As such, they are useful for modulating the areal intensity distribution of light that irradiates a material, for example a photoresist or the nanoparticle covered substrate surfaces of the present disclosure. A typical binary shadow mask includes a pattern of metal thin film, for example chromium. The thin film pattern is supported on a glass plate. Regions having the chromium thin film have high optical density, passing very little or essentially none of the incident light. Regions free of chromium thin film have low optical density, passing a majority of incident light. Accordingly, incident light passes through the mask in the form of a pattern of light (having the same pattern as the pattern of chromium-free regions of the mask). In the current disclosure, photomasks are used to create a pattern of light exposure (or described herein as a pattern of illumination, a pattern of irradiation) for the nanoparticles on the surface of a substrate. The pattern of light exposure leads to a pattern of surface roughening and in turn, a pattern in the light diffusion properties that develop for the substrate surface (e.g., increase in transmitted haze, decrease in clarity). In some embodiments, a grey scale mask is used in order to generate a pattern of light exposure that is characterized by a non-uniform intensity distribution of light. By a non-uniform intensity distribution of light for the pattern of light exposure, what is meant is that the intensity of light that is incident upon the precursor article surface with nanoparticles varies controllably over a range of non-zero values, based on position on the surface, for example continuously. Use of a grey scale mask is an example of any of a number of different possible approaches for exposing the precursor article to a pattern of light with graded intensity.

Further, a non-uniform, varying (e.g., non-binary) intensity distribution or pattern of light can be irradiated onto the surface of a precursor article described herein. A grey scale mask can be used to achieve this condition. Other approaches include the use of optical systems with reflective or transmitting optical elements that focus or defocus light. As is known in the art, reflective optical elements (e.g., mirrors) can be designed to process light from a source (e.g., light emitter (e.g., a flash tube)) so as to yield a non-uniform and spatially varying (i.e., graded) intensity distribution of light on a surface (e.g., on the surface of a precursor article described herein). Examples of such mirrors that are useful for generating a non-uniform intensity distribution of light include elliptical mirrors, including those described in U.S. Pat. No. 6,376,806 (Yoo). As is also known in the art, transmitting optical elements (e.g., lenses) can be designed to process light from a source (e.g., light emitter (e.g., a flash tube)) so as to yield a non-uniform and spatially varying (i.e., graded) intensity distribution of light on a surface (e.g., on the surface of a precursor article described herein). Examples of such lenses that are useful for generating a non-uniform intensity distribution of light include convex condenser lenses, including those described in U. S. Pat. Pub. No. 2016/0351424 (Fuse et al.).

Figure 4:
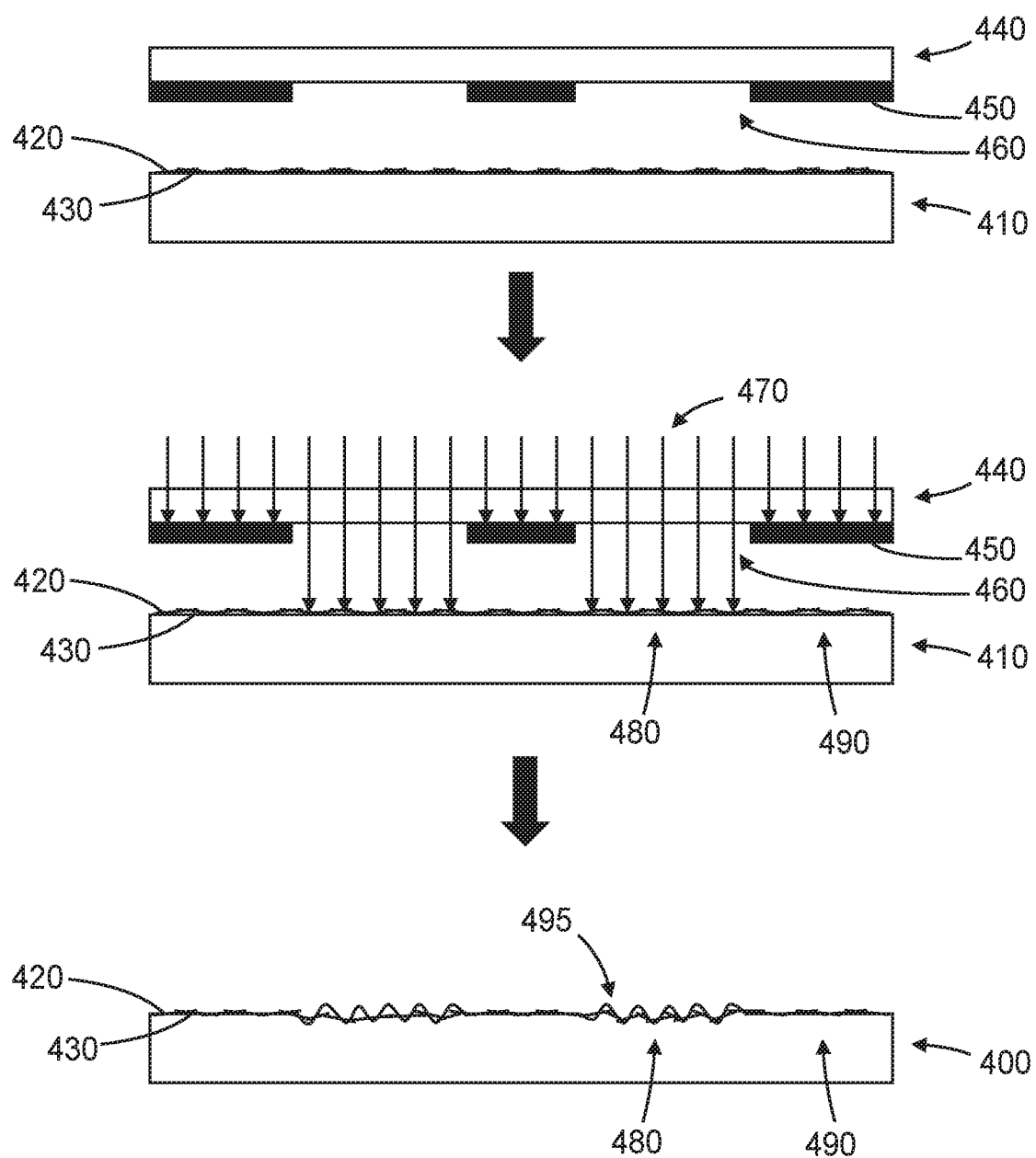
FIG. 4 is a schematic of an exemplary method of making exemplary articles described herein.

FIG. 4 illustrates an exemplary method for making an article described herein 400. Precursor article 410 with major surface 420 having nanowires 430 thereon is provided. Photomask 440, with shadowed region 450 and open region 460 is provided. In the method, pulsed light 470 passes through photomask 440 in region 460 and illuminates precursor article 410 in region 480, while region 490 is not illuminated. Photothermal heating action of pulsed light 470 on nanowires 430 in region 480 leads to roughening 495 of the surface 420 of the article 410, but not in region 490 of article 410, which is not illuminated. In some embodiments, region 480 exhibits higher transmitted haze than region 490.

In some embodiments, illuminating the light absorbing nanoparticles includes delivering energy to the light absorbing nanoparticles in pulses with durations in a range from 0.1 millisecond to 100 milliseconds (in some embodiments, in a range from 1 millisecond to 10 milliseconds). Light pulses can be provided in any of a number of ways known in the art, including via lasers and flash lamps. Flash lamps (also sometimes referred to herein as flash tubes, flash lights, or flash bulbs) are particularly useful for exposing articles (e.g., precursor articles described herein) with large area, for example, in some embodiments at least 1 cm$^2$, at least 10 cm$^2$, or even at least 100 cm$^2$. Flash lamps can be used to expose large areas at once, for example, in some embodiments, at least 1 cm$^2$, at least 10 cm$^2$, or even at least 100 cm$^2$. Power supplies for controlling the discharge of a flash lamp (including duration of discharge) are known in the art (see e.g., U.S. Pat. No. 4,071,808 (Zentmyer) and U.S. Pat. No. 7,501,773 (Tipton)).

In some embodiments, illuminating the light absorbing nanoparticles includes delivering energy to the light absorbing nanoparticles in pulses with energy density (also referred to herein as fluence or dose) of greater than 0.5 (in some embodiments, greater than 0.75, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or even greater than 10; in some embodiments, in a range from 0.5 to 50, 0.75 to 25, 1 to 15, or even 3.5 to 10.0) J/cm$^2$. The pulse of light with specified energy density can be delivered, for example, using a flash lamp as described above. Alternatively, the energy density (or fluence, or dose) can be delivered using a laser, a continuous arc lamp, or a continuous infrared lamp, as are known in the art.

Figure 5:
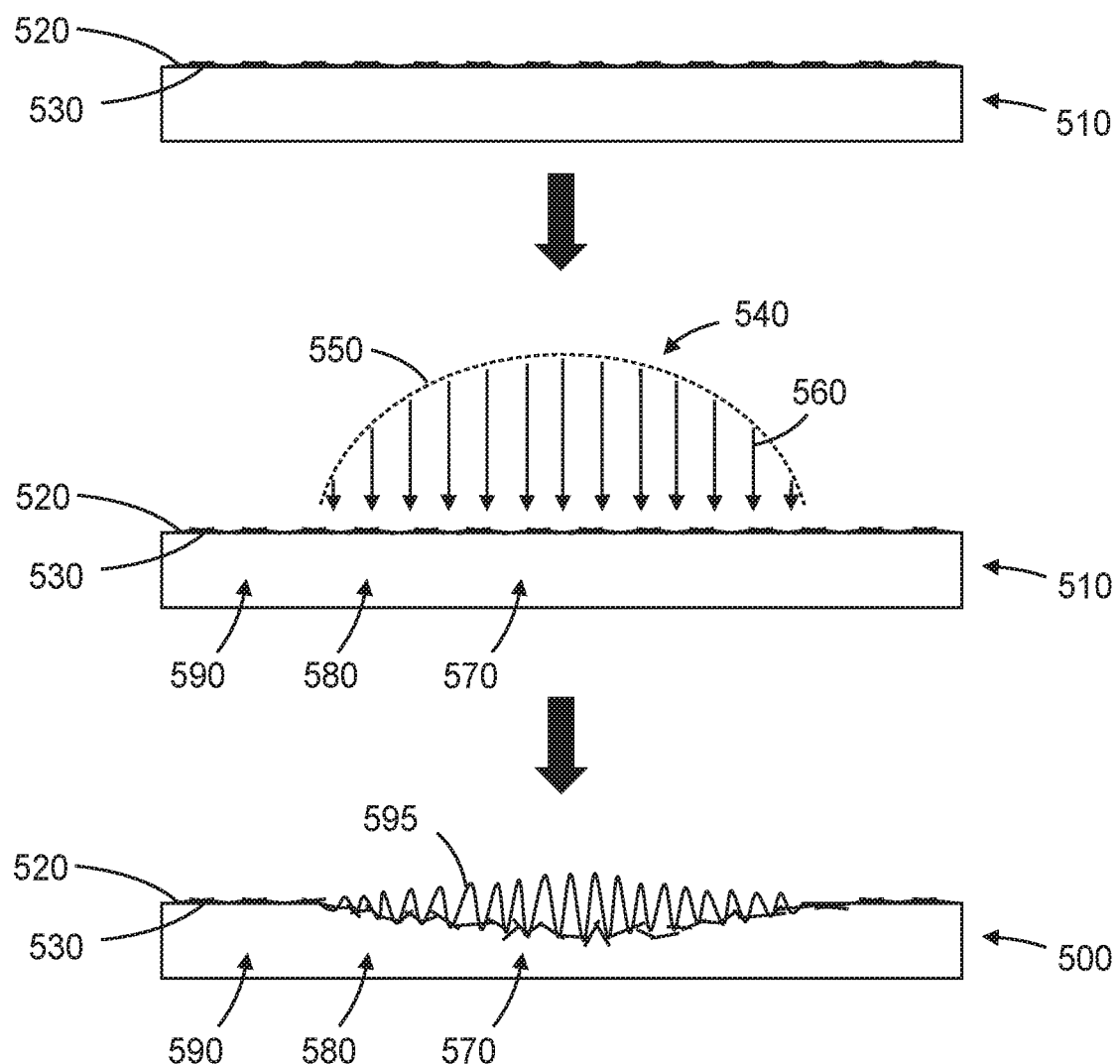
FIG. 5 is a schematic of another exemplary method of making exemplary articles described herein.

FIG. 5 illustrates another exemplary method for making an article described herein 500. Precursor article 510 with major surface 520 having silver nanowires 530 thereon is provided. Precursor article 510 is illuminated with a pulsed light 540 of non-uniform intensity, to yield article 500 with multiple levels of surface roughness and multiple levels of transmitted haze. Pulsed light 540 has spatial distribution 550 of intensity 560. The spatially varying intensity of light leads to spatially varying roughness 595 of major surface 520, with relatively high degree of roughness in region 570, relatively low degree of roughness in region 580, and no light-induced roughness in region 590. The varying degree of roughness can lead to a varying level of transmitted haze: At least one of the spatial variation of intensity of incident light, the spatial variation in surface roughness, and the spatial variation of transmitted haze may be continuous or discontinuous in their variation.

In some embodiments, illuminating includes illuminating with light of spatially varying fluence, wherein first regions are illuminated with a first fluence and second, different regions are illuminated with a second fluence, and wherein the first fluence is greater than the second fluence, such that the first regions are imparted with a surface roughness of a first magnitude and the second regions are imparted with a surface roughness of a second magnitude, wherein the first magnitude is greater than the second magnitude.

In some embodiments, articles described herein are a light diffuser.

EXEMPLARY EMBODIMENTS

1A. An article comprising a substrate comprising a polymer and having first and second opposed major surfaces, wherein the first major surface has
- first surface regions with first nanoparticles partially embedded into the first major surface, and one of
  - (a) second surface regions free of nanoparticles; or
  - (b) second surface regions with at least second nanoparticles on the first major surface or partially embedded into the first major surface, wherein each region has an area of at least 10 square micrometers, wherein the first surface regions have a first average surface roughness, $R_{a1}$, of at least 20 (in some embodiments, at least 25, 50, 75, 100, 150, 200, 250, 300, 400, 500, 600, 700, 800, 900, or even at least 1000; in some embodiments, in a range from 20 to 1000, 25 to 1000, 25 to 500, 30 to 250, or even 40 to 100) nm, wherein the second surface regions have a second average surface roughness, $R_{a2}$, of less than 100 (in some embodiments, less than 95, 90, 80, 75, 70, 60, 50, 45, 40, 35, 30, 25, 20, 15, 10, or even less than 5; in some embodiments, in a range from 1 to 20, 2 to 15, or even 3 to 10) nm, wherein the first average surface roughness, $R_{a1}$, is greater than the second average surface roughness, $R_{a2}$, and wherein there is an absolute difference between the first and second average surface roughness of at least 10 (in some embodiments, at least 15, 20, 25, 50, 75, 100, 150, 200, 250, 300, 400, 500, 600, 700, or even at least 750; in some embodiments, in a range from 10 to 750, 20 to 700, or even 25 to 500) nm.

2A. The article of Exemplary Embodiment 1A, wherein the polymer is transparent.

3A. The article of Exemplary Embodiment 1A, wherein the first surface regions are translucent.

4A. The article of any preceding A Exemplary Embodiment with second surface regions free of nanoparticles.

5A. The article of Exemplary Embodiment 4A, wherein the first major surface of the substrate has a tie layer material in the first surface regions.

6A. The article of Exemplary Embodiment 5A, wherein the first major surface of the substrate is free of a tie layer material in the second surface regions.

7A. The article of any of Exemplary Embodiments 1A to 3A having second surface regions with at least second nanoparticles on the first major surface or partially embedded into the first major surface.

8A. The article of any preceding A Exemplary Embodiment, wherein the first nanoparticles are collectively in a pattern.

9A. The article of any of Exemplary Embodiments 1A to 3A, 7A, or 8A, wherein the second nanoparticles are collectively in a pattern.

10A. The article of any of Exemplary Embodiments 1A to 3A or 7A wherein the nanoparticles are collectively in a pattern.

11A. The article of any preceding A Exemplary Embodiment, wherein the polymer is a thermoplastic.

12A. The article of any preceding A Exemplary Embodiment, wherein the polymer is at least one of poly(ethyleneterephthalate), poly(ethylenenaphthalate), a polycarbonate, a cylo-olefin polymer, a cylo-olefin co-polymer, an acrylate, or a methacrylate.

13A. The article of any preceding A Exemplary Embodiment, wherein sizes of the nanoparticles are in a range from 1 nm to 1 micrometer (in some embodiments, in a range from 10 nm to 100 nm, or even 10 nm to 50 nm).

14A. The article of any preceding A Exemplary Embodiment, wherein the nanoparticles are metallic.

15A. The article of any preceding A Exemplary Embodiment, wherein the nanoparticles comprise at least one of silver, gold, palladium, platinum, copper, or aluminum.

16A. The article of any preceding A Exemplary Embodiment, wherein at least a portion of the nanoparticles are nanowires.

17A. The article of any preceding A Exemplary Embodiment that is a diffuser.

1B. A method of making the article of any preceding A Exemplary Embodiment, the method comprising:
providing a precursor article comprising:
a substrate comprising a polymer and having first and second opposed major surfaces; and
light absorbing nanoparticles arranged on at least a portion of the first major surface of the substrate;
illuminating the portion including at least some of the light absorbing nanoparticles of the first major surface to roughen the portion of the first major surface to provide the article.

2B. The method of Exemplary Embodiment 1B, wherein the light absorbing nanoparticles are arranged on at least a portion of the first major surface of the substrate.

3B. The method of either Exemplary Embodiment 1B or 2B, wherein the polymer is transparent.

4B. The method of either Exemplary Embodiment 1B or 2B, wherein the article is translucent.

5B. The method of any of Exemplary Embodiments 1B to 4B, wherein the light absorbing nanoparticles are arranged in a pattern before illuminating at least some of the light absorbing nanoparticles.

6B. The method of Exemplary Embodiment 5B, wherein the light absorbing nanoparticles are arranged in a pattern according to a tie layer pattern disposed on the first major surface of the substrate.

7B. The method of any preceding B Exemplary Embodiment, wherein illuminating at least some of the absorbing nanoparticles is conducted at at least one wavelength in a range from 180 nm to 3000 nm.

8B. The method of any preceding B Exemplary Embodiment, wherein a mask is position between the precursor article and an illumination source for illuminating at least some of the absorbing nanoparticles prior to illuminating at least some of the absorbing nanoparticles.

9B. The method of any preceding B Exemplary Embodiment, wherein illuminating the light absorbing nanoparticles includes delivering energy to the light absorbing nanoparticles in pulses with durations in a range from 0.1 millisecond to 100 milliseconds (in some embodiments, in a range from 1 millisecond to 10 milliseconds).

10B. The method of any preceding B Exemplary Embodiment, wherein illuminating the light absorbing nanoparticles includes delivering energy to the light absorbing nanoparticles in pulses with energy density in a range from 0.5 to 50 (in some embodiments, in a range from 0.75 to 25, 1 to 15, or even 3.5 to 10) $J/cm^2$.

11B. The method of any preceding B Exemplary Embodiment, wherein illuminating the light absorbing nanoparticles is conducted at least in part using a xenon flashlamp.

12B. The method of any preceding B Exemplary Embodiment, wherein the substrate has a thickness and a visible light transmittance through the thickness of at least 25% (in some embodiments, at least 30%, 35%, 40%, 45%, 50%, 55%, 60%, 65%, 70%, 75%, 80%, 85%, or even at least 90%).

13B. The method of any preceding B Exemplary Embodiment, wherein the substrate has a thickness and a first haze through the thickness of the substrate before illuminating the light absorbing nanoparticles, wherein the article has a thickness (that includes the thickness of the substrate) and a second haze after illuminating the light absorbing nanoparticles for at least some portions of the article, and wherein the second haze is greater than the first haze.

14B. The method of any proceeding B Exemplary Embodiment, wherein illuminating includes illuminating with light of spatially varying fluence wherein first regions are illuminated with a first fluence and second, different regions are illuminated with a second fluence, and wherein the first fluence is greater than the second fluence, such that the first regions are imparted with a surface roughness of a first magnitude and the second regions are imparted with a surface roughness of a second magnitude, wherein the first magnitude is greater than the second magnitude.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Methods for Pulsed Light Treatment

Polymer substrate films (bare films as well as films coated with nanoparticles on a surface thereof (i.e., precursor articles) prepared as described below) were treated under various pulsed light conditions using a xenon flashlamp system (obtained from Xenon Corporation, Wilmington, Mass., under the trade designation "SINTERON S-2100" equipped with Type C bulb).

In a first variation of the Pulsed Light Treatment method (Exemplary Method 1), the precursor article was translated under the bulb, in synchronization with repeated flashes of the bulb in order to treat a larger area. Specific parameters (or conditions) associated with application of Exemplary Method 1 for specific examples are described below.

In a second variation of the Pulsed Light Treatment method (Exemplary Method 2), a single pulse with spatially varying energy density was directed to the precursor article while the substrate remained stationary under the bulb. Specific parameters (or conditions) associated with application of Exemplary Method 2 for specific examples are described below.

In a third variation of the Pulsed Light Treatment method (Exemplary Method 3), a chrome/glass photomask was interposed between the xenon flashlamp and the precursor article. The photomask was placed chrome side down onto the substrate, with both the substrate and the photomask being beneath the downward illuminating xenon flashlamp. The photomask included linear shape openings in the chrome layer having a width of about 250 micrometers or having a width of about 500 micrometers. Specific parameters (or conditions) associated with application of Exemplary Method 3 for specific examples are described below.

Test Methods

Visible light transmittance, transmitted haze and clarity were measured using a benchtop meter (obtained from BYK Additives and Instruments, Wesel, Germany, under the trade designation "HAZE-GARD PLUS 4725").

For samples illuminated with a single pulse having spatially varying energy density, to characterize the spatial distribution of haze for the treated article, a 3-millimeter-wide slot aperture (black anodized aluminum) was interposed between the sample and the light source of the benchtop meter, adjacent to the sample surface. This allowed the instrument to capture scattered transmitted light only for a narrow region of the sample. The aperture was placed over different regions of the treated sample (having been treated with different magnitudes of local pulse energy density), to determine a relative haze for those regions. The haze value reported by the instrument when the slot aperture was used is termed herein "relative haze," acknowledging that the inclusion of the 3-millimeter-wide aperture changes the optics of the meter-sample arrangement, and thus may compromise the instrument's ability to determine a correct absolute value of haze for the small sample area revealed through the aperture.

Sheet resistance was measured using a non-contact sheet resistance meter (Model 20J3, obtained from Delcom Instruments, Inc., Prescott, Wis., under trade designation "20J3 SHEET RESISTANCE METER").

Selected samples were examined with a light microscope outfitted with differential interference contrast optics (Model DM4000M, obtained from Leica Microsystems Inc., Buffalo Grove, Ill.).

Selected samples were examined, including measuring the roughness parameters, using an atomic force microscopy in tapping mode (Model Dimension D3100, obtained from Bruker Corporation, Billerica, Mass.).

Method for Preparing Silver Nanowire Coated PET Substrate (PET Precursor Article)

A silver nanowire coating layer was formed on a polyethylene terephthalate (PET) substrate (a 125-micrometer thick film with glass transition temperature, $T_g$, of 76° C., obtained from DuPont Teijin Films, Chester, Va., under trade designation "MELINEX ST505"). Slot die coating process targeting a pre-metered wet film thickness of about 15 micrometers at a web speed of 10 ft./min. (3.05 m/min.) to form a nanowire layer on a substrate was used. The nanowire layer was then heated to a temperature of 105° C. in an air impingement oven for about 2 minutes, which resulted in a coated and dried transparent and electrically conductive nanowire layer. The silver nanowire coating layer was coated from an aqueous dispersion of silver nanowires (with less than 30 nanometers diameter and greater than 10 micrometers in length, obtained from Cambrios Inc., Sunnyvale, Calif., under the trade designation "INK W"). The dispersion, and therefore the silver nanowire layer, included polymeric material.

The resulting PET Precursor Articles had a sheet resistance of about 50 ohms per square and were used for pulsed light treatments according to the Examples and Comparative Examples described below.

Preparation of Silver Nanowire Coated Cyclo Olefin Polymer (COP) Substrate (COP Precursor Article)

COP Precursor Articles were formed as described above for the PET Precursor Article except that the silver nanowire coating was formed on a cyclo olefin polymer (COP) substrate (a 100-micrometer thick film with a $T_g$ of 163° C., obtained from Zeon Chemicals L.P., Louisville, Ky., under trade designation "ZEONORFILM ZF16-100").

The resulting COP Precursor Articles were used for pulsed light treatments according to the Examples and Comparative Examples described below.

Preparation of Silver Nanowire Coated PEN Substrate (PEN Precursor Article)

A silver nanowire coating layer was formed on the bare (not treated with adhesion promoter) side a polyethylene naphthalate (PEN) substrate (a 100-micrometer thick film with glass transition temperature, $T_g$, of 120° C., obtained from DuPont Teijin Films, under trade designation "TEONEX Q65FA") using a spin coating process as follows. Film pieces measuring about 50 millimeters by 75 millimeters were mounted to glass slides using a removable double-sided tape (available from 3M Company, St. Paul, Minn., under trade designation "3M SCOTCH DOUBLE SIDED REMOVABLE TAPE 238"). The mounted pieces of film were spin-coated at 1000 revolutions per minute with a dispersion of silver nanowires (less than 30 nanometers diameter and greater than 10 micrometers in length (obtained from Cambrios, Inc., under the trade designation "INK A"), diluted to half concentration using a mixture of 90 percent water and 10 percent isopropyl alcohol, by weight).

The resulting PEN Precursor Articles were used for pulsed light treatments according to the Examples and Comparative Examples described below.

Preparation of Silver Nanowire Coated PI Substrate (PI Precursor Article)

PI Precursor Articles were formed in the same manner as PEN Precursor Article described above except that the silver nanowire coating was formed on a polyimide (PI) substrate (a 50-micrometer thick film, obtained from E.I. du Pont de Nemours and Company, Wilmington, Del. under trade designation "KAPTON 200E").

The resulting PI Precursor Articles were used for pulsed light treatments according to the Examples and Comparative Examples described below.

Preparation of Gold Nanoparticle Coated PET2 Substrate (PET2 Precursor Article)

A gold nanoparticle coating layer was formed on a corona treated surface of a polyethylene terephthalate (PET2) substrate (a 50-micrometer thick film with a $T_g$ of 76° C.) using drop casting process. The PET2 film was prepared by extruding and then corona treating its first major surface at a dose of 1000 millijoules per square centimeter. The PET2 films were mounted on glass slides using an optically clear adhesive (obtained from 3M Company, under the trade designation "3M OPTICALLY CLEAR ADHESIVE 8172"), to hold the thin film flat. One milliliter of aqueous gold nanoparticle dispersion (spherical gold nanoparticles, about 60 nanometers in diameter, obtained from Sigma-Aldrich, Incorporated, St. Louis, Mo., under the trade designation "753653") was dispensed onto the PET2 film surface and allowed to dry at room temperature, yielding a first surface region with the gold nanoparticles that was surrounded by a second surface region that was free of the same gold nanoparticles. After drying at room temperature, the drop cast pattern-coated film samples were further dried in an oven at a temperature of 90° C. for 30 minutes.

The resulting PET2 Precursor Articles were used for pulsed light treatments according to the Examples and Comparative Examples described below.

Preparation of Graphite Coated PET3 Substrate (PET3 Precursor Article)

A graphite coating layer was formed on a polyethylene terephthalate substrate (a 125-micrometer thick film with glass transition temperature, $T_g$, of 76° C., obtained from DuPont Teijin Films, under trade designation "MELINEX ST505") using a powder rub coating process. The PET3 film was prepared by placing a small amount of graphite powder on the PET film substrate. The graphite was then deposited onto the film using a 10-inch (about 25.5 cm) random orbital waxer/polisher (obtained under the trade designation "WEN 10PMC" from WEN Products, Elgin, Ill.) with a wool polishing bonnet. The graphite powder used was obtained from Asbury Carbons, Asbury, N.J., under the trade designation "MICRO850."

The resulting PET3 Precursor Articles were used for pulsed light treatments according to the Examples and Comparative Examples described below.

Comparative Examples CE1 to CE7 and Examples E8-E12

CE1 was prepared by pulsed light treating a bare PET film (i.e., without a silver nanowire coating thereon) according to Exemplary Method 1 and the conditions summarized in Table 1, below.

TABLE 1

| Example | Pulse Duration, msec | Pulse Energy Density, J/cm$^2$ | Calculated Instantaneous Power Density (W/cm$^2$) | Before Treatment | | | | After Treatment | | | |
| --- | --- | --- | --- | --- | --- | --- | --- | --- | --- | --- | --- |
| | | | | Transmittance, % | Haze, % | Clarity, % | Sheet Resistance, ohm/sq. | Transmittance, % | Haze, % | Clarity, % | Sheet Resistance, ohm/sq. |
| CE1 | 3 | 5.74 | 1900 | 89.2 | 0.7 | 100 | N/A | 90.2 | 0.7 | 100 | N/A |
| CE2 | 0.5 | 0.35 | 700 | 89.5 | 1.4 | 100 | 50 | 89.6 | 1.4 | 100 | 50 |
| CE3 | 1 | 0.76 | 760 | 89.5 | 1.4 | 100 | 50 | 89.6 | 1.4 | 100 | 50 |
| CE4 | 2 | 1.65 | 830 | 89.6 | 1.3 | 100 | 50 | 89.7 | 1.4 | 100 | 50 |
| CE5 | 3 | 2.51 | 840 | 89.4 | 1.4 | 100 | 50 | 89.6 | 1.4 | 100 | 50 |
| CE6 | 0.5 | 0.85 | 1700 | 89.6 | 1.4 | 100 | 50 | 89.6 | 1.4 | 100 | 50 |
| CE7 | 1 | 1.74 | 1740 | 89.7 | 1.4 | 100 | 50 | 89.6 | 1.4 | 100 | 50 |
| E8 | 2 | 3.56 | 1780 | 89.5 | 1.3 | 100 | 50 | 89.5 | 10.0 | 56 | 50 |
| E9 | 2.25 | 4.10 | 1820 | 89.6 | 1.3 | 100 | 50 | 89.3 | 14.1 | 46 | 50 |
| E10 | 2.5 | 4.65 | 1860 | 89.6 | 1.3 | 100 | 50 | 89.2 | 19.8 | 37 | 50 |
| E11 | 2.75 | 5.19 | 1890 | 89.4 | 1.4 | 100 | 50 | 89.1 | 23.3 | 28 | 50 |
| E12 | 3 | 5.74 | 1900 | 89.2 | 1.4 | 100 | 60 | 88.8 | 25.4 | 23 | 60 |

CE2-CE7 and E8-E12 were prepared by pulse light treating a PET Precursor Article sheet prepared above according to the conditions summarized in Table 1, above.

The CE1-CE7 and E8-E12 films were treated with a series of flashlamp exposures in synchronization with translation of the films samples (i.e., the first variation of pulsed light treatment method described above, Exemplary Method 1), with a spatial period of 12 millimeters and translation velocity of 5 millimeters per second.

Table 1, above, summarizes the pulsed light treatment conditions, measured optical properties and sheet resistance values for the CE1-CE7 and E8-E12 samples.

Comparative Examples CE13 and CE14 and Examples E15 and E16

CE13 was prepared in the same manner as CE1 described above except that a bare PEN film (i.e., without a silver nanowire coating thereon) was used according to the conditions summarized in Table 2, below.

TABLE 2

| Example | Pulse Duration, msec | Pulse Energy Density, J/cm$^2$ | Calculated Instantaneous Power Density (W/cm$^2$) | Before Treatment | | | | After Treatment | | | |
| --- | --- | --- | --- | --- | --- | --- | --- | --- | --- | --- | --- |
| | | | | Transmittance, % | Haze, % | Clarity, % | Sheet Resistance, ohm/sq. | Transmittance, % | Haze, % | Clarity, % | Sheet Resistance, ohm/sq. |
| CE13 | 3 | 5.74 | 1900 | 88.5 | 0.9 | 100 | N/A | 89.5 | 1.1 | 100 | N/A |
| CE14 | 1 | 1.74 | 1740 | 88.6 | 2.2 | 100 | 400 | 89.4 | 2.1 | 99 | 220 |
| E15 | 2 | 3.56 | 1780 | 88.3 | 2.8 | 100 | 400 | 89.4 | 4.8 | 80 | 400 |
| E16 | 3 | 5.74 | 1900 | 88.3 | 3.3 | 100 | 400 | 89.2 | 5.7 | 60 | >10^4 |

CE14 and E15-E16 were prepared in the same manner as CE2-CE7 and E8-E12, described above, except that the PEN Precursor Articles described above were used according to the conditions summarized in Table 2, above.

Table 2, above, summarizes the pulsed light treatment conditions used, measured optical properties and sheet resistance values for the CE13, CE14, E15 and E16 samples.

Comparative Examples CE17-CE20

CE17 was prepared in the same manner as CE1 described above except that a bare COP film (i.e., without a silver nanowire coating thereon) was used according to the conditions summarized in Table 3, below.

TABLE 3

| Example | Pulse Duration, msec | Pulse Energy Density, J/cm$^2$ | Calculated Instantaneous Power Density (W/cm$^2$) | Before Treatment | | | | After Treatment | | | |
| --- | --- | --- | --- | --- | --- | --- | --- | --- | --- | --- | --- |
| | | | | Transmittance, % | Haze, % | Clarity, % | Sheet Resistance, ohm/sq. | Transmittance, % | Haze, % | Clarity, % | Sheet Resistance, ohm/sq. |
| CE17 | 3 | 5.74 | 1900 | 92.1 | 0.1 | 100 | N/A | 91.9 | 0.1 | 100 | N/A |
| CE18 | 1 | 1.74 | 1740 | 90.8 | 1.0 | 100 | 50 | 90.8 | 1.0 | 100 | 50 |
| CE19 | 2 | 3.56 | 1780 | 90.8 | 1.0 | 100 | 50 | 90.7 | 1.0 | 100 | 50 |
| CE20 | 3 | 5.74 | 1900 | 90.8 | 1.0 | 100 | 50 | 90.7 | 1.0 | 100 | 50 |

CE18-CE20 were prepared in the same manner as CE2-CE7 and E8-E12, described above, except that COP Precursor Articles described above were used according to the conditions summarized in Table 3, above.

Table 3, above, summarizes the pulsed light treatment conditions used, measured optical properties and sheet resistance values for the CE17-CE20 samples.

Comparative Examples CE21-CE24

CE21 was prepared in the same manner as CE1 described above except that a bare PI film (i.e., without a silver nanowire coating thereon) was used according to the conditions summarized in Table 4, below.

Each of the E25 and E26 samples were treated with a single pulse of light while keeping the substrates stationary (i.e., the second variation of pulsed light treatment method described above, Exemplary Method 2) resulting in the non-uniform spatial distribution of energy density summarized in Table 5, above.

Table 5 includes measured haze values for the films before and after pulsed light treatment. Note that the "position" refers to the location of incident light, in millimeters, from the spot directly beneath the bulb (i.e., the "0" position), and in turn increased haze (which was measured using the 3-millimeter aperture method described above).

TABLE 4

| Example | Pulse Duration, msec | Pulse Energy Density, J/cm² | Calculated Instantaneous Power Density, (W/cm²) | Before Treatment | | | | After Treatment | | | |
|---|---|---|---|---|---|---|---|---|---|---|---|
| | | | | Transmittance, % | Haze, % | Clarity, % | Sheet Resistance, ohm/sq. | Transmittance, % | Haze, % | Clarity, % | Sheet Resistance, ohm/sq. |
| CE21 | 3 | 5.74 | 1900 | 54.1 | 1.4 | 97 | N/A | 52.8 | 1.2 | 97 | N/A |
| CE22 | 1 | 1.74 | 1740 | 53.1 | 2.0 | 97 | 300 | 52.7 | 1.5 | 97 | >10^4 |
| CE23 | 2 | 3.56 | 1780 | 54.3 | 1.8 | 97 | 300 | 52.7 | 1.4 | 97 | >10^4 |
| CE24 | 3 | 5.74 | 1900 | 53.6 | 1.8 | 97 | 300 | 48.6 | 1.6 | 96 | >10^4 |

CE22-CE24 were prepared in the same manner as CE2-CE7 and E8-E12, described above, except that PI Precursor Articles described above were used according to the conditions summarized in Table 4, above.

Table 4, above, summarizes the pulsed light treatment conditions used, measured optical properties and sheet resistance values for the CE21-CE24 samples.

Examples E25 and E26

E25 and E26 were prepared using Exemplary Method 2 by pulsed light treating PET Precursor Articles described above according to conditions summarized in Table 5, below.

As illustrated schematically in FIG. 5, the non-uniform distribution of pulse energy density led to a non-uniform distribution of surface roughness and in turn a haze distribution for each film.

Comparative Example CE27 and Examples E28-E30

CE27 was prepared in the same manner as CE1 except that a bare PET2 substrate (i.e., without any gold nanoparticle coating thereon) was used according to the conditions summarized in Table 6, below.

TABLE 5

| Example | Position, mm | Pulse Duration, msec | Pulse Energy Density, J/cm² | Calculated Instantaneous Power Density, (W/cm²) | Before Treatment Relative Haze, % | After Treatment Relative Haze, % |
|---|---|---|---|---|---|---|
| E25 | −12 | 2.5 | 1.80 | 720 | 3.0 | 2.9 |
| | −6 | 2.5 | 3.70 | 1480 | 3.0 | 5.8 |
| | 0 | 2.5 | 4.65 | 1860 | 3.0 | 9.2 |
| | 6 | 2.5 | 4.18 | 1670 | 3.0 | 6.5 |
| | 12 | 2.5 | 2.83 | 1130 | 3.0 | 3.0 |
| E26 | −12 | 3.0 | 2.22 | 740 | 3.0 | 3.0 |
| | −6 | 3.0 | 4.57 | 1520 | 3.0 | 6.9 |
| | 0 | 3.0 | 5.74 | 1913 | 3.0 | 11.7 |
| | 6 | 3.0 | 5.16 | 1720 | 3.0 | 7.1 |
| | 12 | 3.0 | 3.50 | 1165 | 3.0 | 3.0 |

TABLE 6

| Example | Pulse Duration, msec | Pulse Energy Density, J/cm² | Calculated Instantaneous Power Density (W/cm²) | Before Treatment | | | After Treatment | | |
|---|---|---|---|---|---|---|---|---|---|
| | | | | Transmittance, % | Haze, % | Clarity, % | Transmittance, % | Haze, % | Clarity, % |
| CE27 | 3 | 5.74 | 1900 | 88.9 | 1.7 | 100 | 89.6 | 1.9 | 100 |
| E28 | 1 | 1.74 | 1740 | 88.4 | 5.7 | 99 | 88.9 | 18.4 | 98 |
| E29 | 2 | 3.56 | 1780 | 88.5 | 5.4 | 99 | 89.5 | 27.7 | 99 |
| E30 | 3 | 5.74 | 1900 | 88.0 | 7.6 | 98 | 89.9 | 67.1 | 87 |

E28-E30 were prepared in the same manner as CE2-CE7 and E8-E12, described above, except that PET2 Precursor Article described above was used according to the conditions summarized in Table 6, above. Each of E28-E30 samples had a first surface region with gold nanoparticles and a second surface region free of the same gold nanoparticles, as described above.

Table 6, above, summarizes measured optical properties for the CE27 and E28-E30 samples. For E28-E30, the optical properties were measured in the first surface region (region having the gold nanoparticles thereon).

Figure 6A:
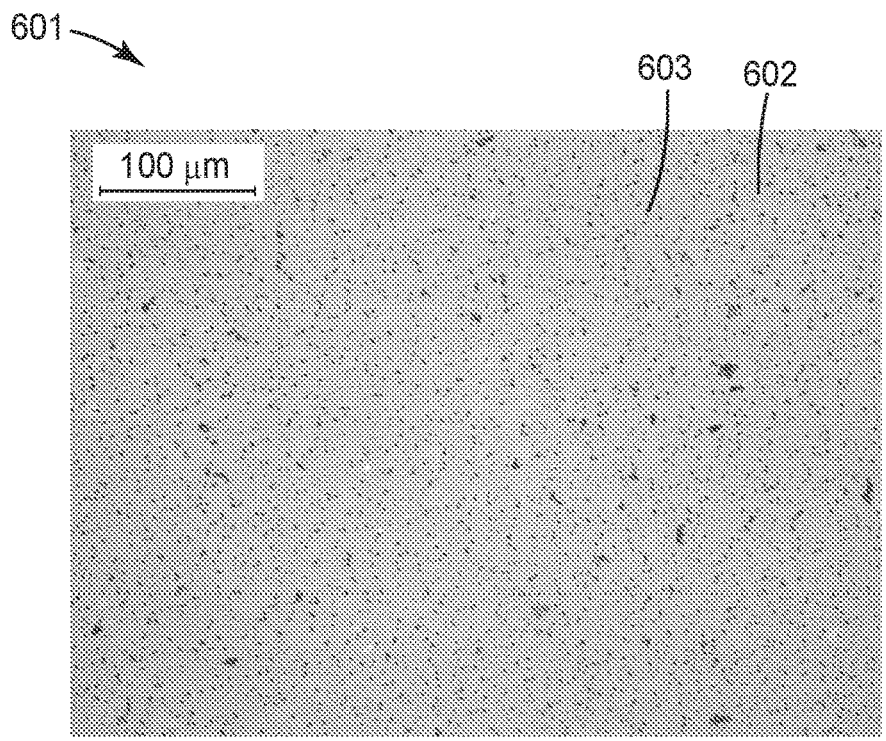
FIGS. 6A and 6B are optical bright field microscope images of an exemplary precursor article and an exemplary article described herein, respectively.
Figure 6B:
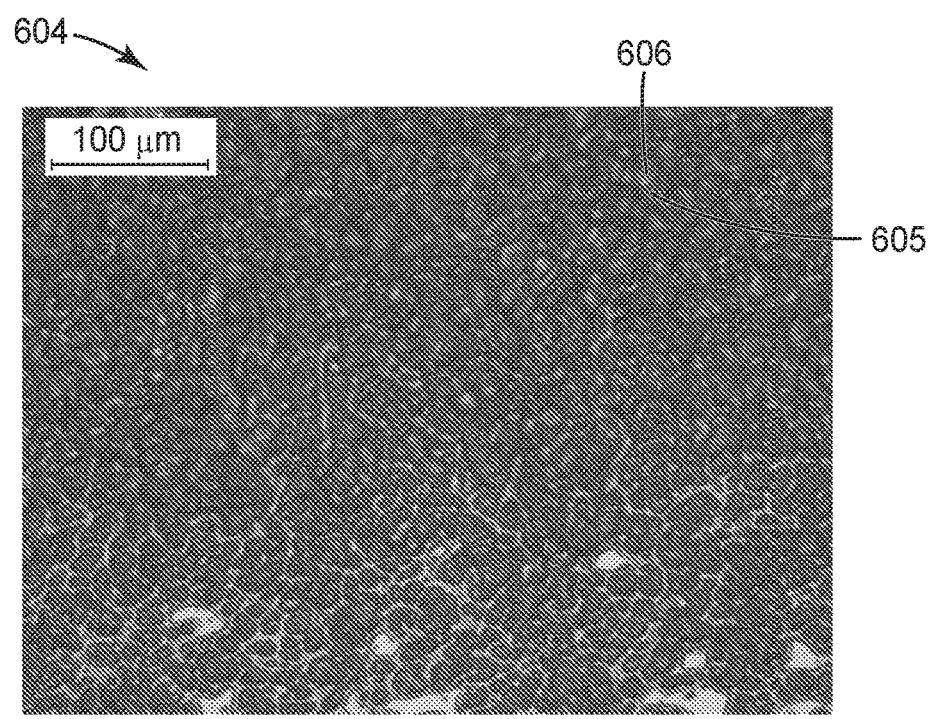

FIGS. 6A and 6B are optical bright field microscopic images of PET2 Precursor Article 601 before pulsed light treatment and PET2 Precursor Article 604 after pulsed light treatment, respectively, of the first surface region of the film substrate of E28 sample. The PET2 Precursor Article 601 included first major surface 602 that was coated with gold nanoparticles 603, the gold nanoparticles 603 thus being deposited on first major surface 602 and adjacent to first major surface 602. After pulsed light treatment, the transparent polymer of the PET2 Precursor Article was rendered with surface roughness 605 in the first surface region having gold nanoparticles 606 at least partially embedded therein.

Microscopic analysis revealed the first surface region of the intense pulsed light treated article of E28 to develop surface roughness as a result of the intense pulsed light treatment, while the second surface region of the article did not develop surface roughness as a result of the intense pulsed light treatment.

Furthermore, the application of increasing doses of intense pulsed light (single pulses with energy densities of 1.74 joule per square centimeter, 3.56 joules per square centimeter, and 5.74 joules per square centimeter) led to increases in measured haze of 12.7%, 22.3%, and 59.5%, respectively, for the treated film articles of E28-E30.

Example 31

A PET Precursor Article film, prepared as described above, was placed beneath and in contact with a chromium/glass photomask. This photomask-film assembly was treated according to Exemplary Method 3 with the xenon flashlamp (using the same pulse parameters as used for E12), with flashlamp light passing through the openings in the mask and onto regions of the film (i.e., the third variation of the pulsed light treatment method described above) to prepare the E31 (treated) sample.

Figure 7A:
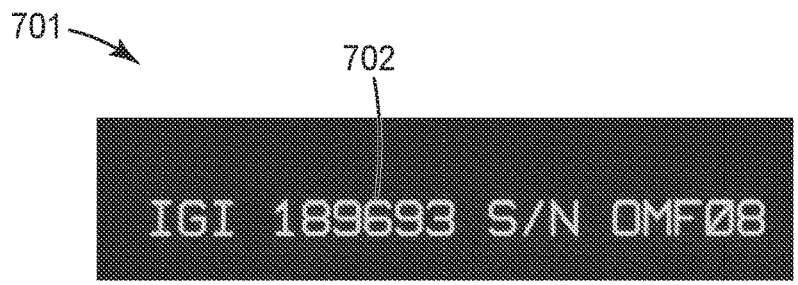
FIGS. 7A and 7B are photographs of an exemplary photomask and an exemplary article described herein, respectively.

FIG. 7A is a photograph of photomask 701, showing straight line and text features (openings) 702 in the photomask pattern.

Figure 7B:
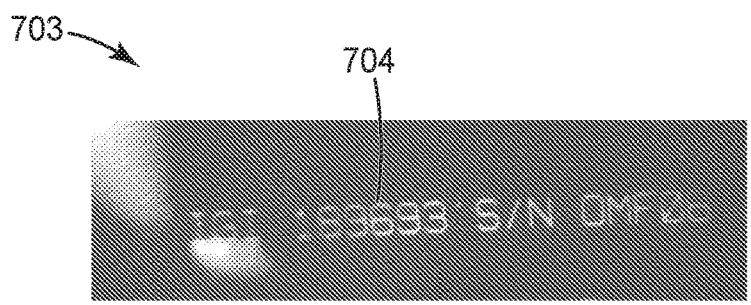

FIG. 7B is a photograph of portion 703 of the resulting E31 sample, showing light diffusing (i.e., hazy, or elevated haze) regions (text) 704 according to the photomask pattern.

Figure 8A:
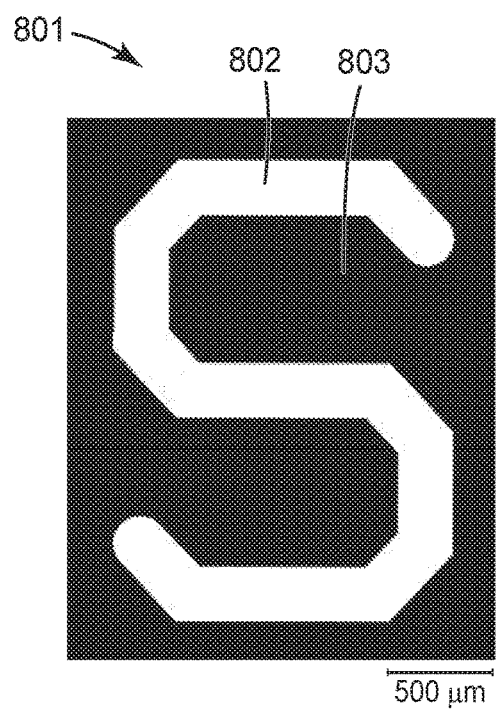
FIGS. 8A and 8B are optical microscope images of an exemplary photomask and an exemplary article described herein, respectively.

FIG. 8A is a microscopic image of letter "S" opening 802 in photomask 801, captured in transmitted light mode. Complementary regions 803 were opaque and do not pass light.

Figure 8B:
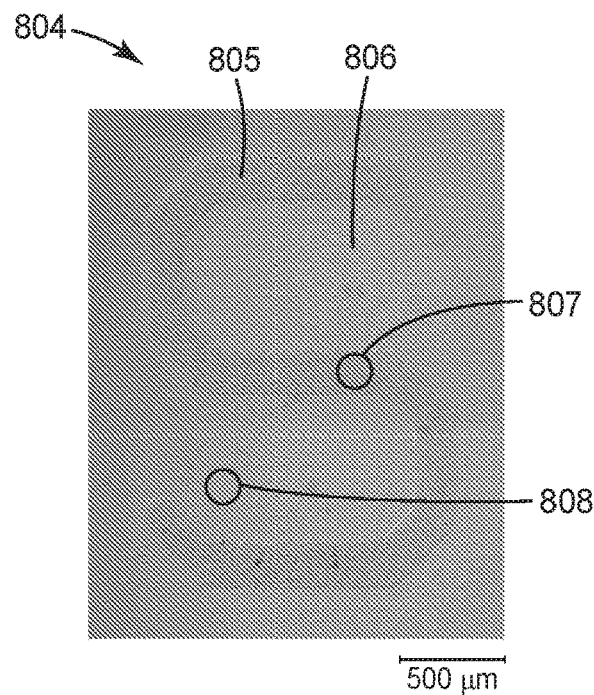

FIG. 8B is a differential interference contrast microscope image of portion 804 of the resulting E31 sample, showing the elevated average surface roughness 807 in letter "S" pattern 805 (first surface region). Complementary regions 806 (second surface region, not illuminated with intense pulsed light) exhibited lower average surface roughness 808.

Figure 9A:
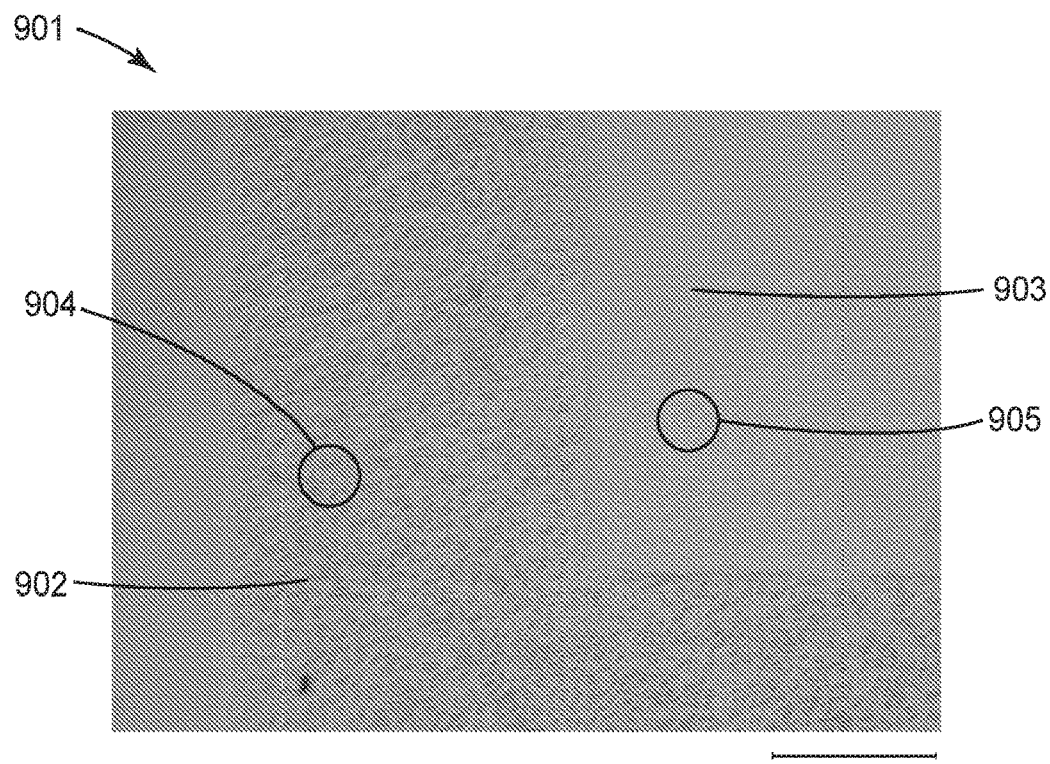
FIGS. 9A and 9B are differential interference contrast and dark field optical microscope images, respectively, of an exemplary article described herein.

FIG. 9A is a differential interference contrast microscope image of portion 901 of the resulting E31 sample, the portion including first surface region 902 in the form of a corner between two straight line features and second surface region 903. First surface region 902, which was illuminated through the photomask with intense pulsed light, includes elevated average surface roughness 904 (also referred to herein as $R_{a1}$) as compared with average surface roughness 905 (also referred to herein as $R_{a2}$) of second surface region 903, which was not illuminated with intense pulsed light.

Figure 9B:
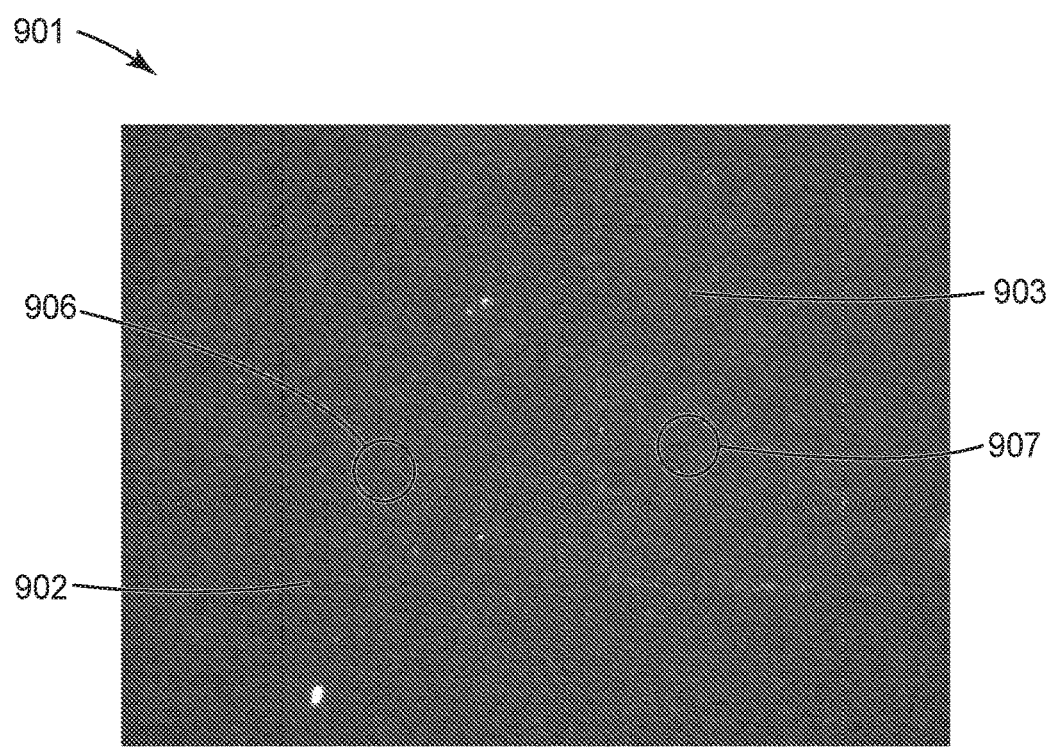

FIG. 9B is a dark field microscope image of the same regions of the E31 sample as imaged in FIG. 9A. Silver nanowires 906 were present in the first surface region 902 (which had been illuminated with intense pulsed light, and included elevated (higher) average surface roughness $R_{a1}$). Silver nanowires 907 were also present in second surface region 903 (which had not been illuminated with intense pulsed light, and exhibited lower average surface roughness $R_{a2}$).

Table 7 (below) lists measured roughness parameters $R_a$ (arithmetic average of the absolute values of the surface height deviations measured from the mean plane of the measurement area) and $R_q$ (root mean squared roughness, or the standard deviation of the height values) for first surface region 902 (coated with silver nanowires and treated with intense pulsed light) and second surface region 903 (coated with silver nanowires and not treated with intense pulsed light).

TABLE 7

| Region | Mean Average of $R_a$, nm | Standard Deviation of $R_a$, nm | Mean Average of $R_q$, nm | Standard Deviation of $R_q$, nm |
|---|---|---|---|---|
| First Surface Region 902 | 41.2 | 12.3 | 52.2 | 15.4 |
| Second Surface Region 903 | 5.4 | 0.4 | 8.8 | 0.6 |

The parameters were measured for five sample areas each of first surface region 902 and second surface region 903, each measuring 50 micrometers by 50 micrometers. Table 7 (above) lists mean and standard deviation values for the measured values of $R_a$ and $R_q$, based on the five sample areas per region type.

Figure 10:
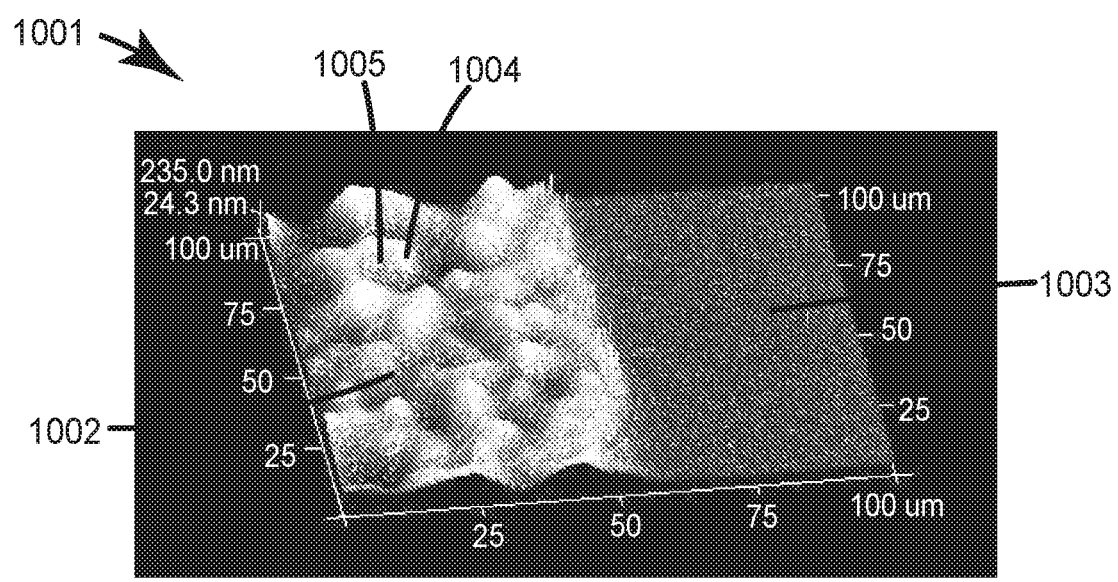
FIG. 10 is an atomic force microscope image of an exemplary article described herein.

FIG. 10 is an atomic force microscope image of the boundary between first surface region 1002 and second surface region 1003 of portion 1001 of E31 sample. First surface region 1002 included increased average surface 1004 roughness of the polymer substrate major surface. Silver nanowires 1005 followed the contour of surface roughness 1004 of the polymer major surface that was induced by exposure to intense pulsed light.

Example 32

A PET3 Precursor Article film, prepared as described above, was placed beneath and in contact with a chromium/glass photomask. This photomask-film assembly was treated according to Exemplary Method 3 with the xenon flashlamp (using the pulse parameters described in Table 8, below), with flashlamp light passing through the openings in the mask and onto regions of the film to prepare the E32 (treated) sample.

TABLE 9

| Region | Mean Average of $R_a$, nm | Standard Deviation of $R_a$, nm | Mean Average of $R_q$, nm | Standard Deviation of $R_q$, nm |
|---|---|---|---|---|
| First Surface Region 1102 | 802.4 | 120.2 | 993.2 | 162.0 |
| Second Surface Region 1103 | 53.6 | 5.6 | 67.9 | 7.5 |

The parameters were measured for five sample areas each of first surface region 1102 and second surface region 1103, each measuring 50 micrometers by 50 micrometers. Table 9 gives mean and standard deviation values for the measured values of $R_a$ and $R_q$, based on the five sample areas per region. $R_{a1}$ (average surface roughness of the first surface region) of 802.4 nm was greater than $R_{a2}$ (average surface roughness of the second surface region) of 53.6 nm, with an absolute difference of 748.8 nm.

TABLE 8

| | | | Calculated | Before Treatment | | | | After Treatment | | | |
|---|---|---|---|---|---|---|---|---|---|---|---|
| Example | Pulse Duration, msec | Pulse Energy Density, J/cm² | Instantaneous Power Density, (W/cm²) | Transmittance, % | Haze, % | Clarity, % | Sheet Resistance, ohm/sq. | Transmittance, % | Haze, % | Clarity, % | Sheet Resistance, ohm/sq. |
| E32 | 3 | 0.95 | 320 | 19.5 | 35.7 | 90.7 | 384 | 91 | 4.9 | 100 | >20,000 |

Figure 11A:
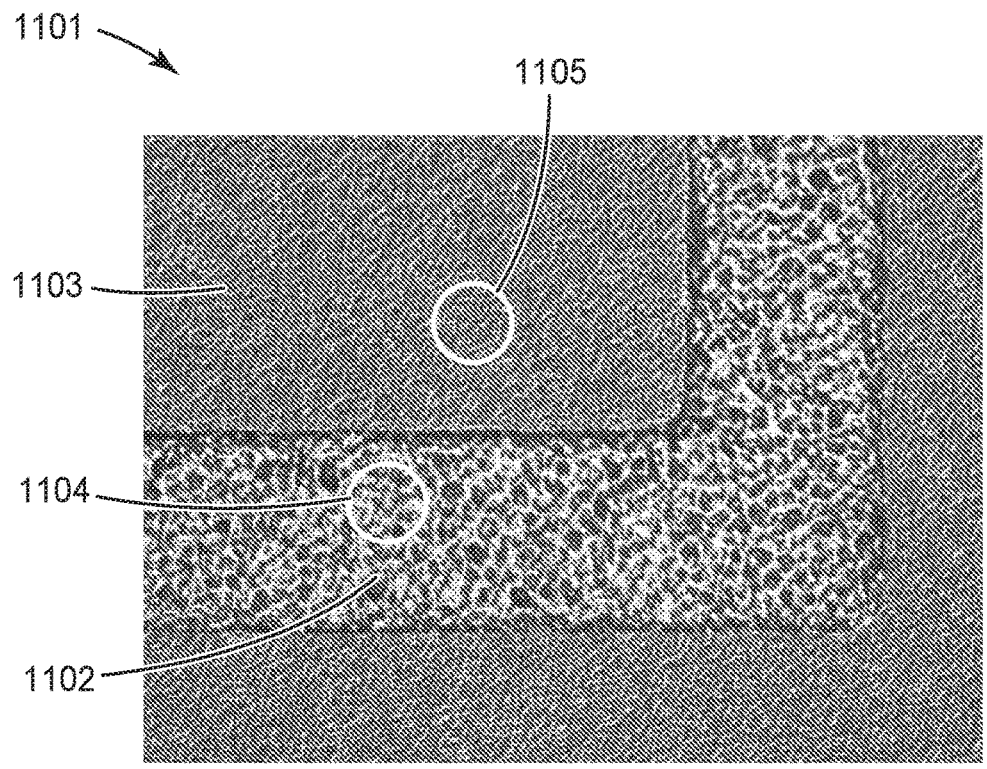
FIG. 11A is a differential interference contrast microscope image of a portion of the Example 32 sample.

FIG. 11A is a differential interference contrast microscope image of portion 1101 of the resulting E32 sample, the portion including first surface region 1102 in the form of a corner between two straight line features and second surface region 1103. First surface region 1102, which was illuminated through the photomask with intense pulsed light, included elevated average surface roughness 1104 (also referred to herein as $R_{a1}$) as compared with average surface roughness 1105 (also referred to herein as $R_{a2}$) of second surface region 1103, which was not illuminated with intense pulsed light.

Figure 11B:
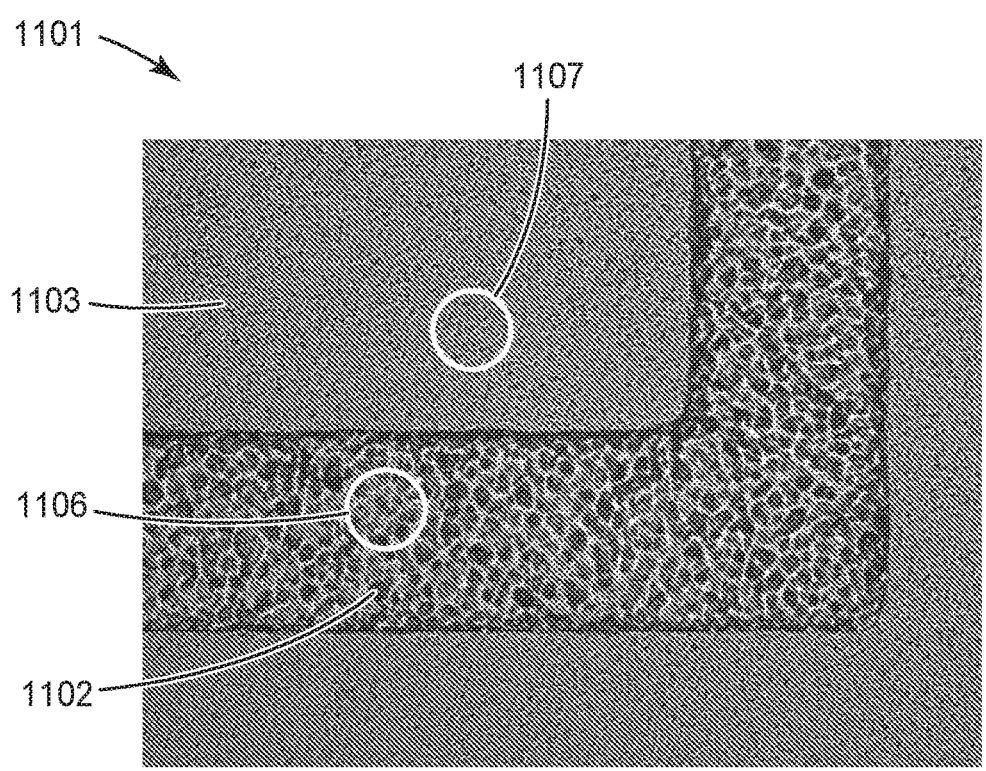
FIG. 11B is a brightfield microscope image of the Example 32 sample.

FIG. 11B is a brightfield microscope image of the same regions of E32 sample as imaged in FIG. 11A. Graphite particles 1106 were present in first surface region 1102 (which had been illuminated with intense pulsed light, and included elevated (higher) average surface roughness $R_{a1}$). Graphite particles 1107 were also present in second surface region 1103 (which had not been illuminated with intense pulsed light, and exhibited lower average surface roughness $R_{a2}$).

Figure 12:
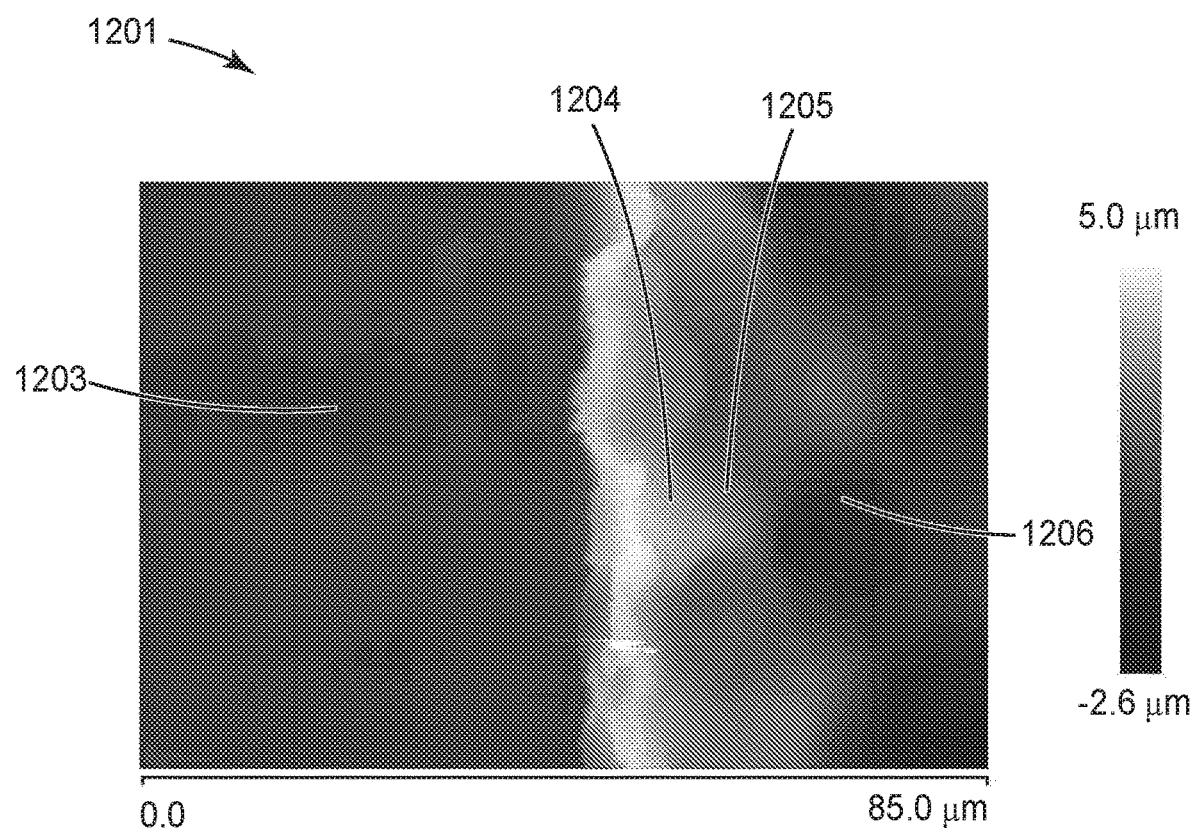
FIG. 12 is an atomic force microscope image of the Example 32 sample.

FIG. 12 is an atomic force microscope image of the boundary between first surface region 1206 and second surface region 1203 of portion 1201 of the E32 sample. First surface region 1206 included increased average surface 1204 roughness of the polymer substrate major surface. Graphite particles 1205 followed the contour of surface roughness 1204 of the polymer major surface that was induced by exposure to intense pulsed light.

Table 9, below, gives measured roughness parameters $R_a$ (arithmetic average of the absolute values of the surface height deviations measured from the mean plane of the measurement area) and $R_q$ (root mean squared roughness, or the standard deviation of the height values) for first surface region 1102 (exemplified by surface region 1206 of FIG. 12 (coated with graphite particles and treated with intense pulsed light)) and second surface region 1103 (exemplified by surface region 1203 of FIG. 12 (coated with graphite particles and not treated with intense pulsed light)).

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An article comprising:
   light emitting diodes; and
   a substrate comprising a polymer and having first and second opposed major surfaces, wherein the first major surface has
      first surface regions with first nanoparticles partially embedded into the substrate, and
      one of
         (a) second surface regions free of nanoparticles; or
         (b) second surface regions with at least second nanoparticles on the first major surface or partially embedded into the substrate,
   wherein each first and second surface region has an area of at least 10 square micrometers, wherein the first surface regions have a first average surface roughness, $R_{a1}$, of at least 20 nm, wherein the second surface regions have a second average surface roughness, $R_{a2}$, of less than 100 nm, wherein the first average surface roughness $R_{a1}$ is greater than the second average surface roughness, $R_{a2}$, and wherein there is an absolute difference between the first and second average surface roughness of at least 10 nm, and
   wherein the article is a backlight unit for a liquid crystal display.

2. The article of claim 1, wherein the polymer is transparent.

3. The article of claim 1, wherein the first surface regions are translucent.

4. The article of claim 1 with the second surface regions free of nanoparticles.

5. The article of claim 4, wherein the first major surface of the substrate has a tie layer material in the first surface regions.

6. The article of claim 5, wherein the first major surface of the substrate is free of a tie layer material in the second surface regions.

7. The article of claim 1 having second surface regions with at least second nanoparticles on the first major surface or partially embedded into the first major surface.

8. The article of claim 1, wherein the first nanoparticles are collectively in a pattern.

9. The article of claim 1, wherein the polymer is a thermoplastic.

10. The article of claim 1, wherein the polymer is at least one of poly(ethyleneterephthalate), poly(ethylenenaphthalate), a polycarbonate, a cyclo-olefin polymer, a cyclo-olefin co-polymer, an acrylate, or a methacrylate.

11. The article of claim 1, wherein at least one dimension of the first and second nanoparticles is in a range from 1 nm to 1 micrometer.

12. The article of claim 1, wherein the first and second nanoparticles are metallic.

13. The article of claim 1, wherein at least a portion of the first and second nanoparticles are nanowires.

14. The article of claim 1 that is a light diffuser.

15. A method of making the article of claim 1, the method comprising:

providing a precursor article comprising:
   a substrate comprising a polymer and having first and second opposed major surfaces; and
   light absorbing nanoparticles arranged on at least a portion of the first major surface of the substrate;
illuminating at least some of the light absorbing nanoparticles to roughen the portion of the first major surface of the substrate to provide the article,
wherein the light absorbing nanoparticles are arranged in a pattern before illuminating at least some of the light absorbing nanoparticles.

16. The method of claim 15, wherein the polymer is transparent.

17. The method of claim 15, wherein the article is translucent.

18. The method of claim 15, wherein illuminating at least some of the light absorbing nanoparticles is conducted at least one wavelength in a range from 180 nm to 3000 nm.

19. The method of claim 15, wherein illuminating at least some of the light absorbing nanoparticles includes delivering energy to the light absorbing nanoparticles in pulses with durations in a range from 0.1 millisecond to 100 milliseconds.

20. The method of claim 15, wherein illuminating at least some of the light absorbing nanoparticles includes delivering energy to the light absorbing nanoparticles in pulses with energy density in a range from 0.5 J/cm$^2$ to 50 J/cm$^2$.

* * * * *